(12) United States Patent
Goswami et al.

(10) Patent No.: US 11,403,020 B2
(45) Date of Patent: Aug. 2, 2022

(54) INCREASING SIZES OF BUCKETS OF A FINGERPRINT INDEX

(71) Applicant: HEWLETT PACKARD ENTERPRISE DEVELOPMENT LP, Houston, TX (US)

(72) Inventors: Sudhanshu Goswami, Durham, NC (US); Sonam Mandal, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 16/669,941

(22) Filed: Oct. 31, 2019

(65) Prior Publication Data

US 2021/0132837 A1 May 6, 2021

(51) Int. Cl.
*G06F 3/06* (2006.01)
(52) U.S. Cl.
CPC .......... *G06F 3/0641* (2013.01); *G06F 3/0608* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 6,725,321 B1 * | 4/2004 | Sinclair | G06F 3/0679 711/103 |
| 7,464,103 B2 | 12/2008 | Siu et al. | |
| 7,664,927 B2 | 2/2010 | Erlingsson et al. | |
| 8,311,964 B1 | 11/2012 | Efstathopoulos et al. | |
| 8,392,384 B1 | 3/2013 | Wu et al. | |
| 8,489,613 B1 | 7/2013 | Ioffe et al. | |
| 8,812,555 B2 | 8/2014 | Larson et al. | |
| 8,868,926 B2 | 10/2014 | Hunt et al. | |
| 8,898,119 B2 | 11/2014 | Sharma et al. | |
| 8,924,687 B1 | 12/2014 | Fraiiong et al. | |
| 9,430,164 B1 | 8/2016 | Botelho et al. | |
| 9,542,401 B1 | 1/2017 | Veeraswamy et al. | |
| 9,594,674 B1 | 3/2017 | Mondal | |

(Continued)

OTHER PUBLICATIONS

Alex, et al., "How do HashTables deal with collisions?," retrieved May 31, 2019, (web page), <https://stackoverflow.com/questions/4980757/how-do-hashtables-deal-with-collisions> (15 pages).

(Continued)

*Primary Examiner* — Yaima Rigol
(74) *Attorney, Agent, or Firm* — Trop, Pruner & Hu, P.C.

(57) ABSTRACT

In some examples, a system performs data deduplication using a fingerprint index comprising a plurality of buckets, each bucket of the plurality of buckets comprising entries associating fingerprints for data units to storage location indicators of the data units, wherein a storage location indicator of the storage location indicators provides an indication of a storage location of a data unit in persistent storage. For adding a new fingerprint to the fingerprint index, the system detects that a corresponding bucket of the plurality of buckets is full, in response to the detecting, adds space to the corresponding bucket by taking a respective amount of space from a further bucket of the plurality of buckets, and inserts the new fingerprint into the corresponding bucket after increasing the size of the corresponding bucket.

20 Claims, 20 Drawing Sheets

(56) References Cited

U.S. PATENT DOCUMENTS

| | | | |
|---|---|---|---|
| 9,639,543 | B2 | 5/2017 | Li et al. |
| 9,798,728 | B2 | 10/2017 | Zheng |
| 9,965,203 | B1 | 5/2018 | Agarwala et al. |
| 9,977,746 | B2 | 5/2018 | Muppalaneni et al. |
| 10,169,365 | B2 | 1/2019 | Maheshwari |
| 10,175,894 | B1* | 1/2019 | Visvanathan ......... G06F 3/0641 |
| 10,353,884 | B2 | 7/2019 | Sharma et al. |
| 10,380,073 | B2* | 8/2019 | Kuo ...................... G06F 16/285 |
| 2007/0136518 | A1* | 6/2007 | Slater .................... G06F 3/0605 |
| | | | 711/111 |
| 2008/0005141 | A1 | 1/2008 | Zheng et al. |
| 2012/0254199 | A1 | 10/2012 | Kuno et al. |
| 2014/0310476 | A1* | 10/2014 | Kruus ................ G06F 12/0871 |
| | | | 711/133 |
| 2014/0372456 | A1 | 12/2014 | Merrill |
| 2017/0286005 | A1* | 10/2017 | Sala .................... G06F 12/0223 |
| 2017/0286313 | A1* | 10/2017 | Jiang .................. G06F 12/1018 |
| 2017/0364414 | A1 | 12/2017 | Pogosyan et al. |
| 2018/0253254 | A1 | 9/2018 | Jain |
| 2019/0108123 | A1* | 4/2019 | Anghel ............... G06F 12/0646 |
| 2019/0384530 | A1* | 12/2019 | Twitto ................... G06F 3/0673 |
| 2021/0109900 | A1* | 4/2021 | McIlroy .............. G06F 16/1752 |

OTHER PUBLICATIONS

Debnath, B. et al., "ChunkStash: Speeding Up Inline Storage Deduplication Using Flash Memory," Jun. 2010, https://www.usenix.orq/legacy/events/atc10/tech/full_papers/Debnath.pdf (15 pages).

Fagin et al., "Extendible hashing—a fast access method for dynamic files," 1979, ACM Transactions on Database Systems (TODS), vol. 4, No. 3, pp. 315-344, <https://web.archive.org/web/20170809061915/www.informatik.uni-jena.de//dbis/lehre/ws2005/dbs1/ExHashOrig.pdf>.

Goswami et al., U.S. Appl. No. 16/669,930 entitled Merging Buffered Fingerprint Index Entries filed Oct. 31, 2019 (83 pages).

Goswami et al., U.S. Appl. No. 16/669,955 entitled Sampling Fingerprints in Bins filed Oct. 31, 2019 (81 pages).

Goswami et al., U.S. Appl. No. 16/669,993 entitled Indirect Block Containing References to Blocks of a Persistent Fingerprint Index filed Oct. 31, 2019 (81 pages).

lwn.net, Log-structured file systems: There's one in every SSD, Sep. 18, 2009 (33 pages).

Naga Malleswari, T.Y. et al., "Deduplication Techniques: A Technical Survey," Dec. 2014, International J Innovative Res Sci Technol 1.7, http://www.ijirst.org/articles/IJIRSTV1I7112.pdf (8 pages).

Rosenblum et al., The Design and Implementation of a Log-Structured File System, Feb. 1992 (27 pages).

Shalev, et al., "Split-Odered Lists-Lock-free Resizable Hash Tables," 2003, Proceedings of the Twenty-Second ACM Symposium on Principles of Distributed Computing (PODC 2003), <http://www.cs.tau.ac.il/~afek/SplitOrderListHashSS03.pdf> (25 pages).

Tom White, "Consistent Hashing," Nov. 27, 2007, (web page), <http://www.tom-e-white.com/2007/11/consistent-hashing.html> (9 pages).

Triplett, et al., "Resizable, Scalable, Concurrent Hash Tables via Relativistic Programming," Jun. 15, 2011, USENIX Annual Technical Conference, vol. 11, <https://www.usenix.org/legacy/event/atc11/tech/final_files/Triplett.pdf> (14 pages).

Vaithianathan et al., U.S. Appl. No. 16/361,367 entitled Dynamic Adjustment of Fingerprints Added to a Fingerprint Index filed Mar. 22, 2019 (36 pages).

Viswanath, K., "NetApp Data Compression, Deduplication, and Data Compaction: Data ONTAP 8.3.1 and Later," Feb. 2018, https://www.netapp.com/us/media/tr-4476.pdf (75 pages).

Wang, D. et al., "LevelStore: A Large Scale Key-value Store for Deduplication Storage System," Information Technology Journal, 2013, pp. 2101-2110, https://scialert.net/fulltext/?doi=itj.2013.2101.2110.

Wikipedia, Log-structured file system last edited Sep. 1, 2018 (2 pages).

Witold Litwin, "Linear Hashing : A New Tool for File and Table Addressing," Oct. 1, 1980, vol. 80, <http://users.eecs.northwestern.edu/~peters/references/Linearhash80.pdf> (12 pages).

Xie, F. et al., "Estimating Duplication by Content-based Sampling," USENIX Annual Technical Conference, 2013, pp. 181-186, https://www.usenix.org/system/files/conference/atc13/atc13-xie.pdf.

Virginia Tech Algorithm Visualization Research Group, "Bucket Hashing," Hashing Tutorial, Section 4, available online at <https://research.cs.vt.edu/AVresearch/hashing/buckethash.php>, Aug. 24, 2011, 2 pages.

Wikipedia, "Hash Table", available online at <https://en.wikipedia.org/w/index.php?title=Hash_table&oldid=917666732>, Sep. 24, 2019, 18 pages.

* cited by examiner

INCREASING SIZES OF BUCKETS OF A FINGERPRINT INDEX

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations of the present disclosure are described with respect to the following figures.

Figure 1:
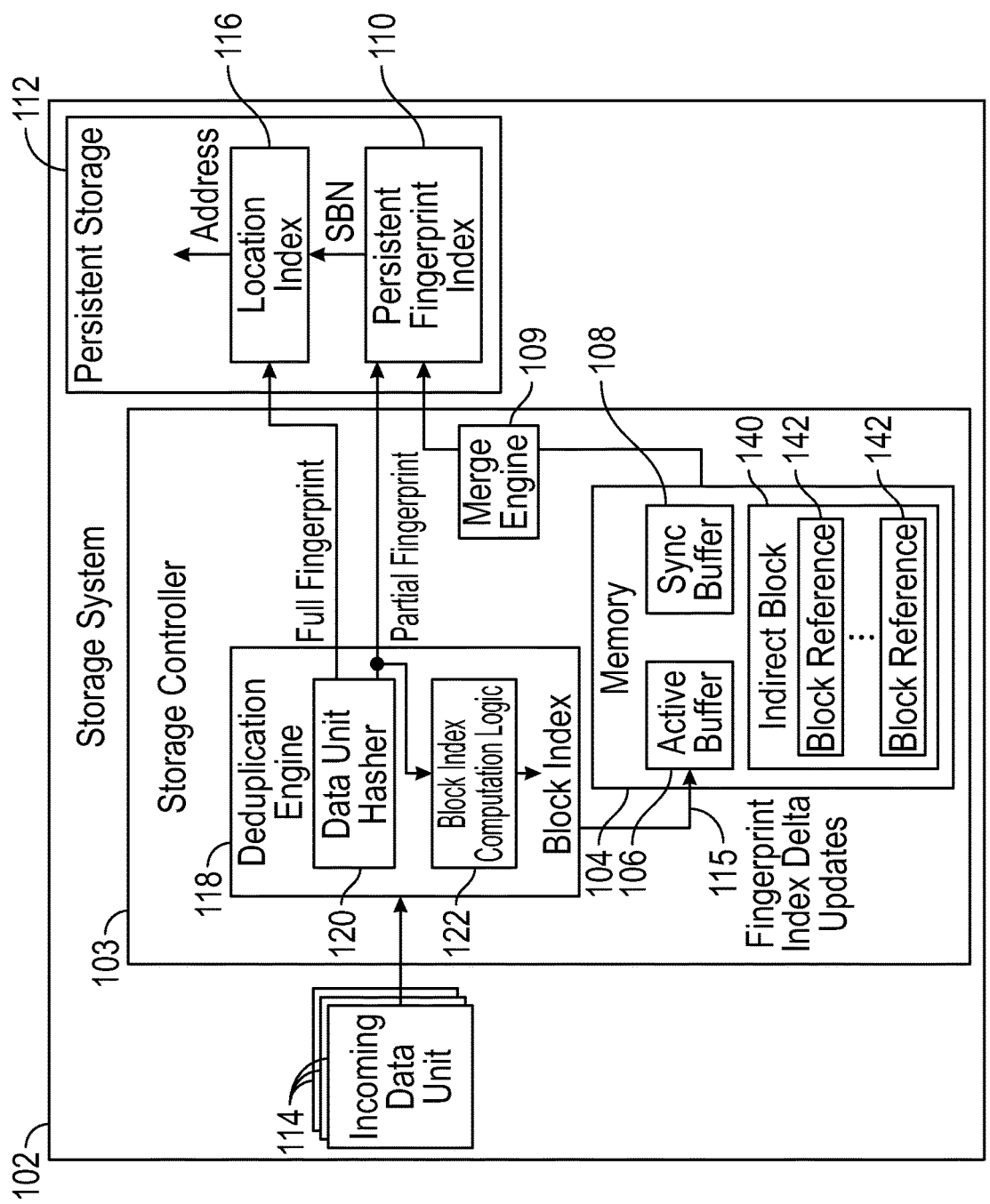
FIG. 1 is a block diagram of a storage system that includes a fingerprint index and an in-memory indirect block containing references to blocks of the fingerprint index, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, data deduplication is accomplished by computing a fingerprint of an incoming data unit that is to be stored into a storage system. A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

A "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

Fingerprints represent data units stored in the storage system. Full fingerprints uniquely identify respective data units (the difference between full fingerprints and partial fingerprints is discussed further below). A fingerprint computed for an incoming data unit can be compared to fingerprints stored in a fingerprint index. The fingerprint index maps fingerprints for data units to storage location indicators of the data units. A "storage location indicator" can refer to any information that provides an indication of a storage location of a data unit in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

In some examples, the fingerprint index maps fingerprints to storage block numbers (SBNs). An SBN is an example of a storage location indicator referred to above. An SBN is useable to determine where a data unit is physically stored in persistent storage. However, in some examples, the SBN does not actually identify the physical location, but rather, the SBN can be used to derive a physical address or other value that identifies a physical location.

A match between the fingerprint of the incoming data unit with a fingerprint in the fingerprint index indicates that the incoming data unit may be a duplicate of a data unit already stored in the storage system. If the incoming data unit is a duplicate of an already stored data unit, instead of storing the duplicative incoming data unit, a reference count stored in the storage system can be incremented to indicate the number of instances of the data unit that have been received.

As the storage system fills up with data units, the size of the fingerprint index on persistent storage increases. Keeping a large fingerprint index up to date can be costly in terms of resource usage. To improve performance, the fingerprint index can be maintained at multiple storage levels, including the persistent storage level and a memory level. The persistent storage level can include persistent storage (examples given above). The memory level can include volatile storage, which may have a higher access speed and may be more expensive than persistent storage device(s). The volatile storage can be implemented using volatile storage device(s), such as dynamic random access memory (DRAM) device(s), static random access memory (SRAM) device(s), and so forth.

The fingerprint index can be stored in the persistent storage, while fingerprint index delta updates for updating the fingerprint index can be temporarily stored in a buffer in faster volatile storage (which may be referred to as "memory" herein and has a faster access speed than the persistent storage). A "fingerprint index delta update" can refer to update information for the fingerprint index for an incoming data unit that is to be stored in a storage system. For example, a fingerprint index delta update for an incoming data unit can include a fingerprint (e.g., a hash value) computed for the data unit, and a storage location indicator (e.g., an SBN) for the data unit.

The fingerprint index delta updates in the buffer can be merged with the fingerprint index on the persistent storage. The merging of the fingerprint index delta updates with the fingerprint index can refer to a process of applying the fingerprint index delta updates that include additions, deletions, location changes, and/or any other form of changes to an older version of the fingerprint index on the persistent storage in order to create a new version of the fingerprint index on the persistent storage that contains the applied changes.

A fingerprint index delta update in the buffer can also be equivalently referred to as a "fingerprint index entry" in the buffer, and this fingerprint index entry in the buffer is to be merged into the persistent fingerprint index.

In some examples, a fingerprint index can be in the form of a B-tree index including nodes arranged in a hierarchical manner. Leaf nodes of the B-tree index include entries that map fingerprints to storage location indicators. Intermediate nodes of the B-tree index are used to find a matching entry of the B-tree index based on a fingerprint.

However, using a B-tree index may be associated with various issues. For example, performing binary searches at multiple levels of the B-tree index may employ significant processing and memory resources. Further, each intermediate node of the B-tree index may include information regarding keys (fingerprints) and sizes of data units. As a result, loading nodes of the B-tree index into memory may consume a relatively large amount of the memory, may consume bandwidth (in terms of a number of input/output (I/O) operations) of persistent storage when transferring the B-tree index nodes from the persistent storage to the memory, and may consume processing resources when computing values (e.g., checksums) based on the information in the copied nodes of the B-tree index.

In accordance with some implementations of the present disclosure, rather than store a fingerprint index in a B-tree, a fingerprint index is stored as a log structured hash table in some examples. The log structured hash table stores fingerprint index entries of the fingerprint index in buckets within blocks of the log structured hash table. Each fingerprint index entry maps a fingerprint for a data unit to a storage location indicator of the data unit. The storage location indicator can be used to determine a storage location of the data unit stored by the persistent storage.

In some examples, a log structured hash table stores entries of a fingerprint index in a series of blocks, with each block including a number of buckets. Each block of the fingerprint index is a unit of the log structured hash table and is uniquely identifiable using a block index (discussed further below). Each bucket is a partition of a leaf block, and is uniquely identifiable using a bucket index (discussed further below). Each bucket can in turn store multiple fingerprint index entries. As the log structured hash table grows in size, additional blocks are appended. The blocks of the log structured hash table are part of a log structured file system (LFS) according to some examples. In the log structured hash table, the fingerprint index entries of the fingerprint index are sorted in order of values of the fingerprints of the fingerprint index entries.

Unlike in a B-tree, a log structured hash table is not arranged as a hierarchical tree structure, but rather includes a sequence of portions (referred to as "buckets") containing the fingerprint index entries in sorted order (in ascending or descending order of fingerprint values, for example). In some examples, the buckets can be included in blocks, which can in turn be included in segments. The blocks and buckets can be variably sized (discussed further below).

The blocks of the log structured hash table that stores fingerprint index entries are referred to as leaf blocks. In some examples, the log structured hash table can further include an indirect block that stores references to the leaf blocks.

Additionally, searching a log structured hash table does not involve a binary search (as would be the case with a B-tree), which can allow the search to be more efficient than searching a B-tree.

Arranging a fingerprint index as a log structured hash table can reduce usage of memory, reduce bandwidth consumption of a storage system, reduce processing resources, and so forth, as compared to using a B-tree fingerprint index.

In further implementations, efficient techniques or mechanisms of merging fingerprint index delta updates (fingerprint index entries) contained in a synchronization buffer (equivalently referred to as a "sync buffer" or an "update buffer" in the present disclosure) stored in a memory with fingerprint index entries of the fingerprint index stored in the log structured hash table are provided. The fingerprint index delta updates contained in the sync buffer are in-memory fingerprint index entries for incoming data units, where the in-memory fingerprint index entries are stored in the memory (and more specifically, in the sync buffer) and have not yet been persisted to the fingerprint index stored in the log structured hash table in the persistent storage.

When adding a new fingerprint index entry corresponding to a new fingerprint to the persistent fingerprint index, a bucket full condition may occur in which a bucket for the new fingerprint index entry is full. A "bucket full condition" can refer to a condition in which a bucket is completely filled with data of fingerprint index entries, or alternatively, a condition where the amount of space in the bucket that is available is insufficient to store the new fingerprint index entry (e.g., the size of the new fingerprint index entry exceeds the size of the available space in the bucket).

If the bucket full condition results in the new fingerprint not being added to the persistent fingerprint index (i.e., the new fingerprint is simply discarded), that may adversely impact data deduplication performance if duplicative data units are stored in the storage system. In other examples, a bucket full condition may result in the new fingerprint being added to a different bucket that is linked to the full bucket in the fingerprint index. Linking buckets that store fingerprint index entries can add to the overhead associated with maintaining the persistent fingerprint index and looking up entries of the persistent fingerprint index.

In accordance with some implementations of the present disclosure, when a bucket of the persistent fingerprint index for a new fingerprint is full, the bucket can be dynamically increased in size to allow the new fingerprint index entry to be added to the bucket. In addition, if all buckets in a block of the persistent fingerprint index are full, then the block can be dynamically increased in size so that a bucket can grow in size to receive the new fingerprint index entry.

As noted above, fingerprint index delta updates for incoming data units newly received at a storage system can be temporarily stored in an sync buffer, where the fingerprint index delta updates (also equivalently referred to as "fingerprint index entries") in the sync buffer can be merged with the persistent fingerprint index once the sync buffer becomes full. In some examples, dual buffers can be used, where the dual buffers include an active buffer and an sync buffer. The sync buffer stores fingerprint index entries that are to be merged with the persistent fingerprint index. While the merging of the fingerprint index entries in the sync buffer with the persistent fingerprint index is occurring, the active buffer can receive fingerprint index entries for additional incoming data units.

In some cases, if the storage system load is high (e.g., due to a large persistent fingerprint index and/or a large number of read and write requests) and incoming data units are being received at a high rate from requester device(s), the active buffer can fill up before the sync buffer completes merging with the persistent fingerprint index. This situation results in an update backlog issue. If the active buffer is completely filled, then the storage system may cease to perform deduplication such that duplicative data units are stored in the persistent storage of the storage system, which may reduce deduplication performance (e.g., the deduplication ratio achieved by the storage system).

In addition, the new version of the persistent fingerprint index (the version into which fingerprint index entries from the sync buffer are being merged) may be unavailable for lookup until the merge process is completed. In addition, if a crash of the storage system occurs (e.g., due to a fault of machine-readable instructions, a fault of a hardware component, etc.), then any work already performed for the merge process may be lost.

In accordance with some implementations of the present disclosure, in response to a triggering condition, adaptive sampling of fingerprints added to the persistent fingerprint index is performed to dynamically adjust a proportion of incoming data units for which fingerprints are added to the persistent fingerprint index.

Sampling of fingerprints can vary between full sampling and partial sampling. With full sampling, fingerprints for all incoming data units that are not duplicative of data units already stored in the storage system are added to the persistent fingerprint index. An incoming data unit for which a duplicative data unit is not already stored by the storage system is referred to as a "non-duplicative incoming data unit" in the ensuing discussion.

With partial sampling, a specified percentage (e.g., 80%, 50%, 40%, etc.) (less than all) of fingerprints for non-duplicative incoming data units are added to the persistent fingerprint index. For example, if the partial sampling of fingerprints is set at 50%, then fingerprints for 50% of non-duplicative incoming data units are added to the persistent fingerprint index. The fingerprints for the remaining 50% of non-duplicative incoming data units are not added to the persistent fingerprint index. A special case of partial sampling is 0% sampling, in which no fingerprints for non-duplicative incoming data units are added to the persistent fingerprint index.

As discussed in detail further below, in accordance with some implementations of the present disclosure, a persistent fingerprint index is divided into multiple bins. Each bin includes a respective active buffer and sync buffer in memory, and a portion of the persistent fingerprint index in persistent storage. With full sampling, fingerprints for all non-duplicative incoming data units are added to respective bins of the multiple bins. With partial sampling, fingerprints for some of the non-duplicative incoming data units are added to some (one bin or plural bins) of the multiple bins, but not other bins (one bin or plural bins) of the multiple bins.

1. Storage System Including Persistent Fingerprint Index with Leaf Blocks and Indirect Blocks, and in-Memory Indirect Blocks FIG. 1 shows an example of a storage system 102 that includes a memory 104 that includes an active buffer 106 and a sync buffer 108. Although just one active buffer 106 and one sync buffer 108 are shown in FIG. 1, in other examples, the storage system 102 can include multiple active buffers 106 and/or multiple sync buffers 108 (such as in examples where a fingerprint index is divided into multiple bins as discussed further below). In examples described herein, the memory 104 may be implemented by one or more volatile storage devices, for example.

More generally, in other examples, the storage system 102 can have a different arrangement. For example, instead of including both an active buffer 106 and a sync buffer 108, just one buffer can be used.

The active buffer 106 is used to receive fingerprint index delta updates 115 corresponding to incoming data units 114, while fingerprint index delta updates in the sync buffer 108 are merged by a merge engine 109 with a persistent fingerprint index 110 in persistent storage 112 of the storage system 102.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware stored on at least one machine-readable storage medium) executable on the hardware processing circuit.

The merge engine 109 and a deduplication engine 118 (discussed further below) can be part of a storage controller 103 of the storage system 102. The memory 104 can also be part of the storage controller 103.

The incoming data units 114 are associated with write requests for writing data to the storage system 102, where the data is stored in the persistent storage 112. The write requests can be issued by requester device(s) (not shown) coupled to the storage system 102, such as over a network. As noted above, a fingerprint index delta update (or equivalently, a "fingerprint index entry") for an incoming data unit 114 includes a fingerprint and a corresponding storage location indicator for the incoming data unit.

In some examples, once the merging of the fingerprint index delta updates of the sync buffer 108 with the persistent fingerprint index 110 on the persistent storage 112 has completed, the designation of the active buffer and the sync buffer can be switched, such that the buffer that was previously designated the active buffer becomes the sync buffer, and the buffer that was previously designated the sync buffer becomes the active buffer for receiving further fingerprint index delta updates.

Figure 2:
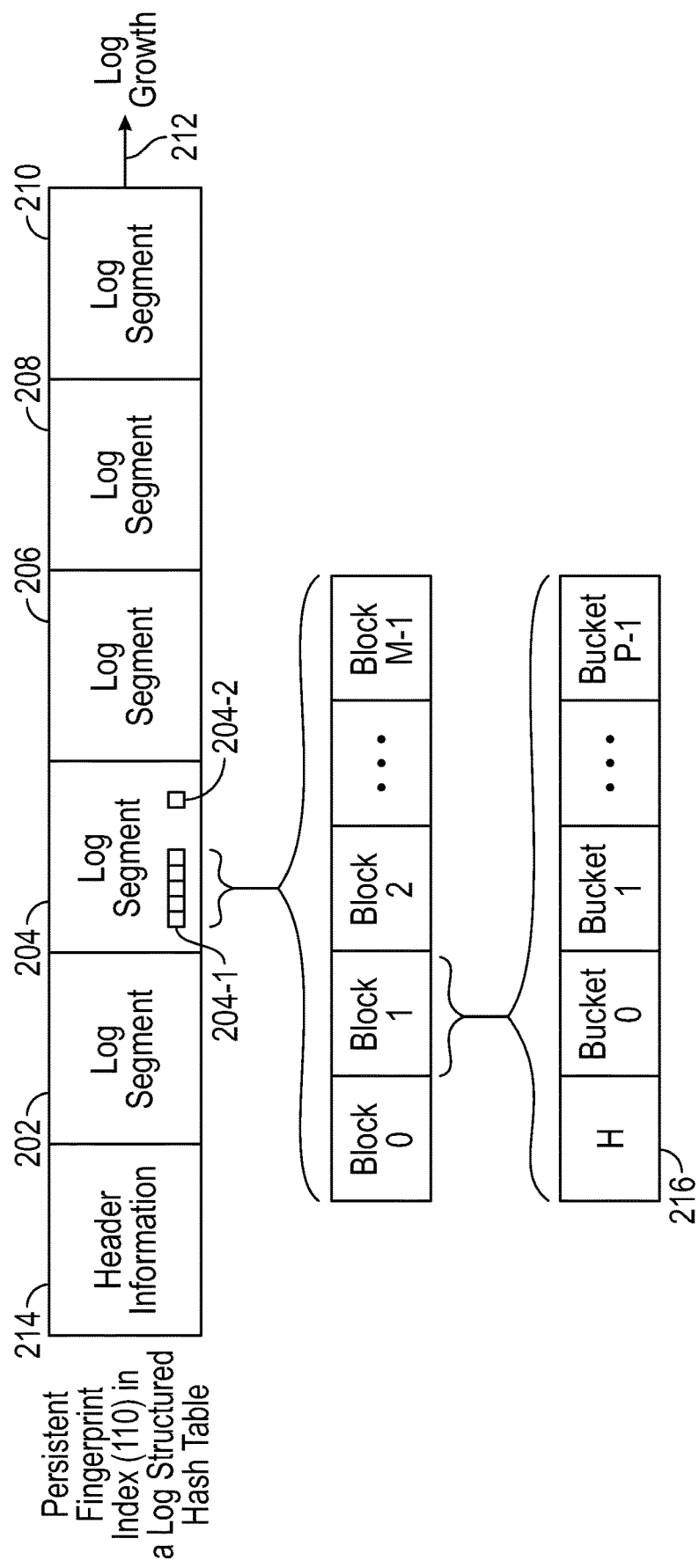
FIG. 2 is a block diagram that illustrates segments, blocks, and buckets of a fingerprint index according to some examples.

FIG. 2 illustrates further details of the persistent fingerprint index 110 that is arranged as a log structured hash table according to some examples. In the example shown in FIG. 2, the log structured hash table includes various log segments 202, 204, 206, 208, and 210. A log segment of the log structured hash table that contains the persistent fingerprint index 110 can have a fixed size in some examples, such as 10 megabytes (MB) or some other size. Each log segment can store a leaf block (or multiple leaf blocks) and/or an indirect block (or multiple indirect blocks). A leaf block (e.g., any of leaf blocks 204-1 in the log segment 204) stores fingerprint index entries. An indirect block (e.g., 204-2 in the log segment 204) contains references to leaf blocks. A "reference" to a leaf block can include an indication of a location (e.g., a physical address) in the persistent storage 112 where the leaf block is stored.

In some examples, indirect blocks are "pinned" to the memory 104 of the storage system 102 (FIG. 1). For example, as shown in FIG. 1, the memory 104 stores an indirect block 140. Although FIG. 1 shows just one indirect block 140 in the memory 104, it is noted that the memory 104 can store multiple indirect blocks 140 in other examples.

An indirect block being pinned to the memory 104 means that the indirect block remains stored in the memory 104; in other words, the indirect block 140 is normally not removed from the memory 104 during operation of the storage system 102, absent an abnormal condition (e.g., the memory 104 being full, a system crash, etc.).

The indirect block 140 contains an array of block references 142 that identify locations of respective leaf blocks in the persistent fingerprint index 110. For example, the block references 142 can include physical addresses of the locations in the persistent storage 112 where the referenced leaf blocks are stored.

In some examples, a leaf block that stores buckets containing fingerprint index entries can have a nominal size of 8 kilobytes (KB). A leaf block can grow in size up to 16 KB (an example leaf block maximum size) to accommodate more fingerprint index entries if the leaf block becomes full.

Although specific size values have been specified for leaf and indirect blocks, it is noted that in other examples, leaf and indirect blocks can have other sizes.

In some examples, an indirect block can be 1 MB in size. By setting the size of an indirect block to be much larger than the size of a leaf block, the total number of blocks that are stored in the persistent fingerprint index 110 is reduced (as compared to a case where an indirect block has a size similar to that of a leaf block).

As leaf blocks are added to the persistent fingerprint index 110 and a corresponding number of block references are added to an indirect block, the indirect block can become full (i.e., filled with block references to leaf blocks such that the indirect block does not have sufficient space to receive additional block references), another indirect block can be created and added to a log segment.

As further shown in FIG. 2, the log structured hash table that contains the persistent fingerprint index 110 grows in size by appending additional blocks in the direction indicated by arrow 212 (e.g., the additional blocks can be appended to an end of the log structured hash table). The log structured hash table further includes header information 214 that identifies locations of indirect blocks (if present) within each log segment. Leaf blocks and indirect blocks can mix within a same log segment. The location information (in the header information 214) for each indirect block identifies a log segment (within which the indirect block is contained) and an offset within the log segment in which the indirect block is contained.

As further shown in FIG. 2, the log segment 204 includes multiple leaf blocks 204-1. For example, the multiple leaf blocks 204-1 include M leaf blocks, including block 0, block 1, block 2, . . . , block M−1, where M≤2. Each leaf block further includes P buckets, including bucket 0, bucket 1, . . . , bucket P−1, where P≤2. In some examples, there is a fixed number of buckets per block, such as 4 or some other number. There can be a variable amount of blocks per segment.

In some examples, each bucket has a variable size. If a bucket is full, the size of the bucket can be increased to accommodate additional fingerprint index entries.

Each bucket includes a number of fingerprint index entries, where each fingerprint index entry associates a fingerprint with a storage location indicator. Each fingerprint index entry includes a key-value pair, where the key represents the fingerprint and the value represents the storage location indicator.

A leaf block also includes block header information 216, which includes information indicating the size of the leaf block, information indicating a number of fingerprint index entries in each of the N buckets of the leaf block, and possibly other information.

As further shown in FIG. 1, the deduplication engine 118 of the storage controller 103 performs data deduplication for the incoming data units 114. To perform data deduplication, the deduplication engine 118 uses the persistent fingerprint index 110 and a location index 116, which are stored in the persistent storage 112.

Note that although the location index 116 and the fingerprint index 110 are shown as stored in the persistent storage 112, in some cases, portions of the location index 116 and the fingerprint index 110 may be retrieved into the memory 104 for faster lookup.

In examples where the persistent storage 112 includes a storage disk, the location index 116 is referred to as a "disk index." The location index 116 may be in the form of a B-tree index, or can have a different format in other examples. In some examples, the persistent fingerprint index 110 maps fingerprints to storage block numbers (SBNs). An SBN is useable to determine where a data unit is physically stored in persistent storage 112. However, the SBN does not actually identify the physical location.

The location index 116 maps SBNs retrieved from the persistent fingerprint index 110 to corresponding physical locations, such as physical addresses of the persistent storage 112. More specifically, each entry of multiple entries (e.g., leaf nodes of a B-tree storing the location index 116) maps a corresponding SBN to a respective physical location (e.g., physical address) as well as to a full fingerprint (explained further below). Thus, given a fingerprint of an incoming data unit, if a lookup of the persistent fingerprint index 110 using the given fingerprint produces a match to an entry of the persistent fingerprint index 110, then that match produces an SBN corresponding to the given fingerprint. The SBN is then used to look up the location index 116, which maps the SBN to a corresponding identifier of a physical location (e.g., a physical address) of a data unit.

In some examples, the fingerprints stored by the persistent fingerprint index 110 are partial fingerprints, which includes a portion (i.e., less than an entirety) of a full fingerprint computed by applying a fingerprint function on the content of a data unit. For example, a partial fingerprint can include a partial hash value that includes a portion of a full hash value (such as a subset of the bits that make up the full hash value).

In addition to mapping SBNs to corresponding physical locations, each entry of the location index 116 also maps a respective SBN to a corresponding full fingerprint (e.g., full hash value). In some examples, a lookup of the persistent fingerprint index 110 is a lookup of a partial fingerprint computed based on an incoming data unit 114. In such examples, a match of the partial fingerprint in the persistent fingerprint index 110 is not conclusive regarding whether or not a duplicative data unit is already stored by the storage system 102. Because a partial fingerprint is used by the persistent fingerprint index 110, potentially multiple different data unit values can produce the same partial fingerprint.

In such examples, to ensure that the matching entry of the persistent fingerprint index 110 (that matches a partial fingerprint of a given incoming data unit) actually corresponds to a duplicate of the given incoming data unit, the SBN of the matching entry of the persistent fingerprint index 110 is used to retrieve the corresponding entry of the location index 116, where the retrieved entry of the location index 116 maps the SBN to a physical location of the given incoming data unit and the full fingerprint of the given incoming.

The deduplication engine 118 is able to determine, based on the full fingerprint from the location index 116, whether or not the storage system 102 actually contains a duplicate of the given incoming data unit. More specifically, the deduplication engine 118 compares the full fingerprint computed for the given incoming data unit to the full fingerprint retrieved from the location index 116. In such examples, if the full fingerprints match, then the deduplication engine 118 can make a determination that a duplicate of the given incoming data unit is already stored by the storage system 102. As a result, the deduplication engine 118 can decide to not store the given incoming data unit, but instead, can update a count of the number of data units that share the matching full fingerprint. On the other hand, if the full fingerprint computed for the given incoming data unit does not match the full fingerprint retrieved from the location index 116, then that indicates that the storage system 102 does not store a duplicate of the given incoming data unit.

As shown in FIG. 1, the deduplication engine 118 includes a data unit hasher 120 and a block index computation logic 122. Each of the data unit hasher 120 and the block index computation logic 122 can be implemented using a portion of the hardware processing circuit of the deduplication engine 118, or alternatively, can include machine-readable instructions executable by a hardware processing circuit of the deduplication engine 118. Although the data unit hasher 120 and block index computation logic 122 are shown as being part of the deduplication engine 118, it is noted that in other examples, the data unit hasher 120 and/or the block index computation logic 122 can be separate from the deduplication engine 118.

A fingerprint produced by the data unit hasher 120 can include a hash value. In other examples, a different type of fingerprint generator can be used to generate another type of a fingerprint. As shown in FIG. 1, the data unit hasher 120 produces both a full fingerprint that is to be stored in the location index 116 and a partial fingerprint that is to be stored in the persistent fingerprint index 110.

The block index computation logic 122 produces a block index from a partial fingerprint. The block index produced from the partial fingerprint is used as an index to an entry of the indirect block 140 in the memory 104. Different block index values map to different block references 142 in the indirect block 140.

Figure 3:
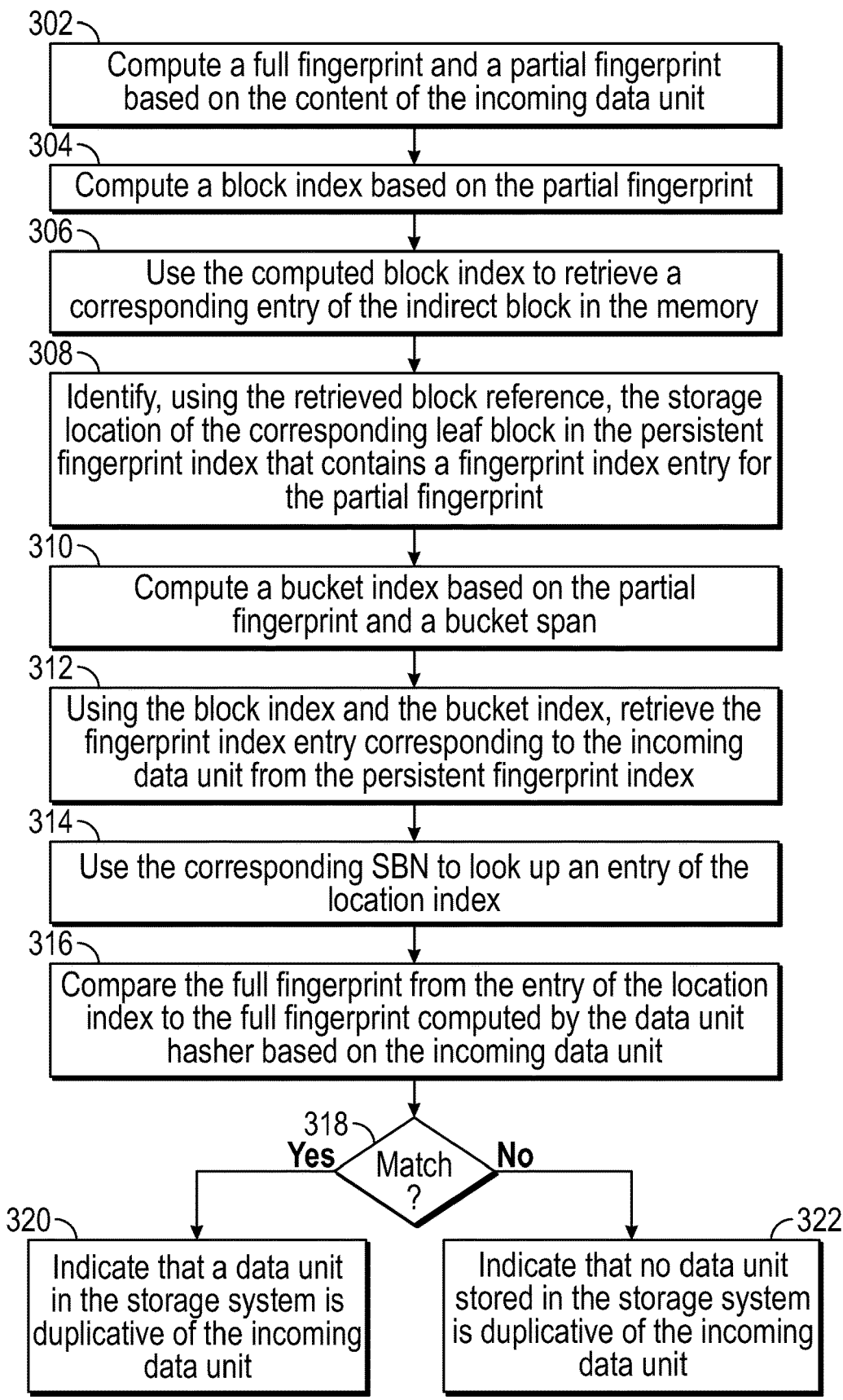
FIG. 3 is a flow diagram of a deduplication process according to some examples.

FIG. 3 is a flow diagram of a process for handling an incoming data unit 114 according to some examples. Although FIG. 3 shows a specific order of tasks, it is noted that in other examples, the tasks can be performed in a different order, or alternatively or additionally, some tasks can be omitted and/or other tasks can be added.

The data unit hasher 120 computes (at 302) a full fingerprint and a partial fingerprint based on the content of the incoming data unit 114. The block index computation logic 122 computes (at 304) a block index based on the partial fingerprint. In some examples, the block index is computed according to Eq. 6 discussed further below.

The deduplication engine 118 uses (at 306) the computed block index to retrieve a corresponding entry of the indirect block 140 in the memory 104. The retrieved corresponding entry contains a block reference 142 that corresponds to the partial fingerprint.

The deduplication engine 118 identifies (at 308), using the retrieved block reference 142, the storage location of the corresponding leaf block in the persistent fingerprint index 110 that contains a fingerprint index entry for the partial fingerprint.

By using the indirect block 140 in the memory 104 to obtain block references relating to locations of corresponding leaf blocks in the persistent fingerprint index 110, the amount of work and the time involved in obtaining the corresponding leaf blocks for incoming data units is reduced. The entries of the indirect block 140 include the block references 142, without including fingerprints in the entries of the indirect block 140, and without including sizes of the leaf blocks in the entries of the indirect block 140. By excluding fingerprints and leaf block sizes from the entries of the indirect block 140, the number of entries of the indirect block 140 can be increased to reference more leaf blocks of the persistent fingerprint index 110. Allowing more entries to be included in the indirect block 140 allows the number of leaf blocks in the persistent fingerprint index 110 to increase. By setting leaf blocks relatively small (between 8 KB and 16 KB for example), the amount of data retrieved from the persistent storage 112 into the memory 104 when a leaf block is retrieved is relatively small, which can save on bandwidth of the storage system 102.

Since the block references 142 identify the locations of corresponding leaf blocks, the leaf block size information does not have to be included in the indirect block 140 to enable retrieval of the corresponding leaf blocks. Instead, the size of each leaf block is obtained from the block header information 216 of a retrieved leaf block.

The deduplication engine 118 further computes (at 310) a bucket index based on the partial fingerprint and a bucket span, according to Eq. 4, as explained further below. The bucket index identifies which bucket within the leaf block at the identified storage location contains the fingerprint index entry for the partial fingerprint.

Using the block index and the bucket index, the deduplication engine 118 retrieves (at 312) the fingerprint index entry corresponding to the incoming data unit from the persistent fingerprint index 110.

The retrieved fingerprint index entry maps the partial fingerprint to a corresponding SBN. The deduplication engine 118 uses (at 314) the corresponding SBN to look up an entry of the location index 116. The entry of the location index 116 maps the corresponding SBN to a respective physical location (e.g., a physical address) and a full fingerprint.

The deduplication engine 118 compares (at 316) the full fingerprint from the entry of the location index 116 to the full fingerprint computed by the data unit hasher 120 based on the incoming data unit 114. If the full fingerprints match (as determined at 318), the deduplication engine 118 indicates (at 320) that a data unit in the storage system 102 is duplicative of the incoming data unit 114. However, if the full fingerprints do not match (as determined at 318), the deduplication engine 118 indicates (at 322) that no data unit stored in the storage system 102 is duplicative of the incoming data unit 114.

Figure 4:
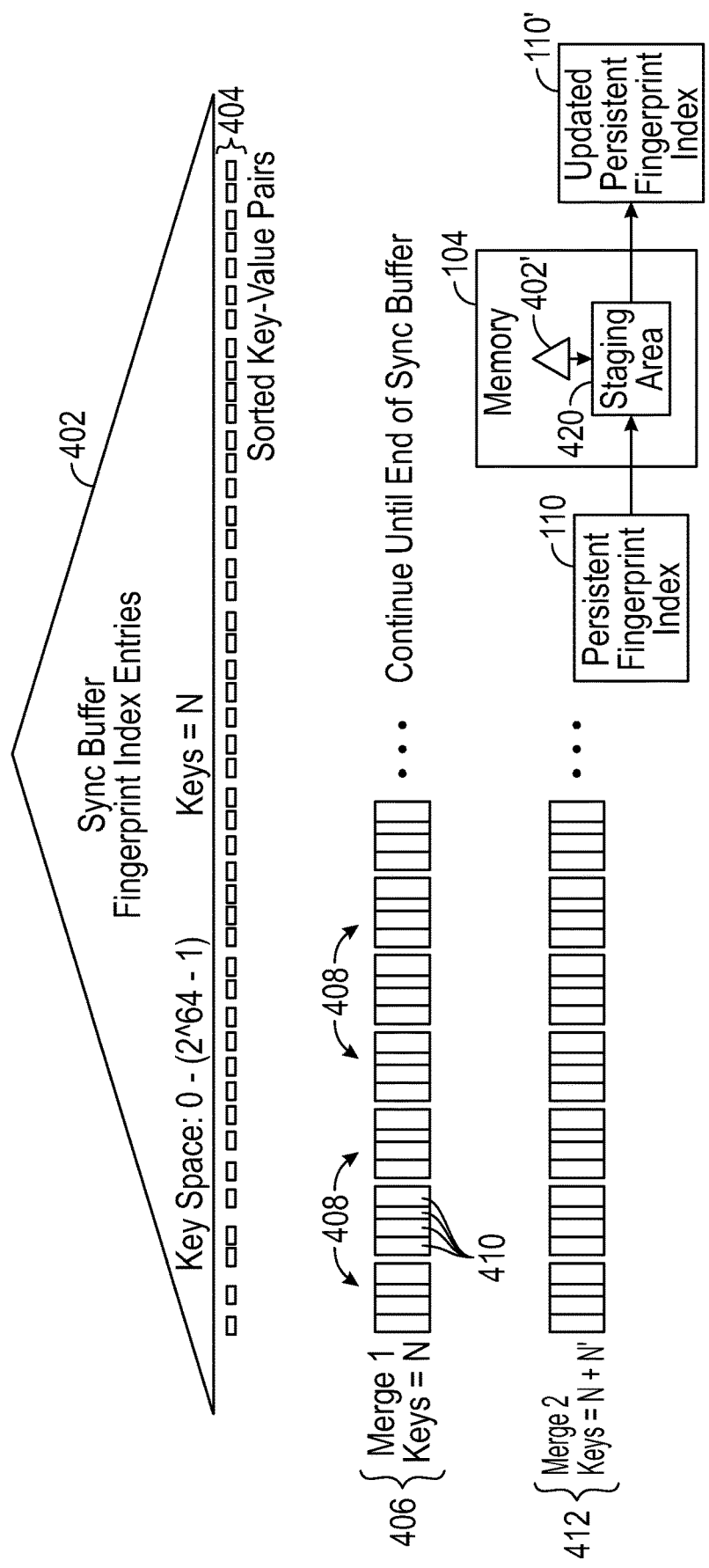
FIG. 4 illustrates an example of merging fingerprint index entries in an in-memory sync buffer with fingerprint index entries of a persistent fingerprint index in persistent storage, according to some examples.

2. Merging Sync Buffer Fingerprint Index Entries with the Persistent Fingerprint Index FIG. 4 illustrates an example of merging sync buffer fingerprint index entries 402 into the persistent fingerprint index 110, according to some examples. The sync buffer fingerprint index entries 402 are stored in the sync buffer 108 of FIG. 1. The sync buffer fingerprint index entries 402 include key-value pairs 404 (where a key includes a fingerprint and a value includes a storage location indicator, such as an SBN) that are in sorted order (e.g., ascending order or a different order).

In the example of FIG. 4, the sorting of the key-value pairs is according to values of the keys, i.e., the fingerprints that are to be merged into the persistent fingerprint index 110. In the example as shown in FIG. 4, it is assumed that each key (fingerprint) is 64 bits in length, such that the key space of possible values of the keys is $2^{64}-1$. In other examples, each key can have a different length, which would correspond to a different key space of possible key values.

Each key-value pair 404 is represented by a small rectangle in FIG. 1. In some examples, the sync buffer fingerprint index entries 402 can be arranged in a B-tree, such that the key-value pairs are stored in corresponding leaf nodes of the B-tree. In other examples, the key-value pairs 404 are arranged in a different data structure.

The merging of the key-value pairs 404 into the persistent fingerprint index 110 is performed in sorted order (e.g., ascending order) of the key-value pairs 404 in the sync buffer. For example, during the merging, the merge engine 109 can pass through the sync buffer in order from the key-value pair 404 with the lowest key value to the key-value pair 404 with the highest key value.

Initially, it can be assumed that the persistent fingerprint index 110 is empty. Merging the sync buffer fingerprint index entries 402 into an empty persistent fingerprint index 110 is depicted as Merge 1 (406) in FIG. 4. Merge 1 merges the N (N≤2) fingerprint index entries in the sync buffer 108 into leaf blocks 408 of the persistent fingerprint index 110. As shown in FIG. 4, each leaf block 408 includes 4 buckets 410. In other examples, each leaf block 408 can include a different number of buckets. In some examples, the number of buckets included in each leaf block 408 is fixed. In other examples, the number of buckets included in each leaf block 408 can be variable.

Note that the merging of fingerprint index entries from the sync buffer 108 into buckets 410 can be performed in a region of the memory 104. When 4 buckets 410 are written into each leaf block 408 in the memory 104, the leaf block 408 can be persistently written into the persistent fingerprint index 110 in the persistent storage 112.

FIG. 4 further shows another merge operation, Merge 2 (412), that is performed after Merge 1, such that the persistent fingerprint index 110 includes N fingerprint index entries prior to the start of Merge 2. Merge 2 is performed after completion of Merge 1 and after the sync buffer in the memory 104 has been filled with N' (where N' can be the same as or different from N) additional sync buffer fingerprint index entries 402'.

Merge 2 merges the additional N' sync buffer fingerprint index entries 402' in the sync buffer 108 into the persistent fingerprint index 110 that already includes N fingerprint index entries.

As shown in FIG. 4, portions of the persistent fingerprint index 110 can be retrieved into a staging area 420 in the memory 104. For example, a log segment of the persistent fingerprint index 110 can be retrieved into the staging area 420 to merge with a corresponding portion of the additional N' sync buffer fingerprint index entries 402'. When the in-memory log segment has merged the corresponding portion of the additional N' sync buffer fingerprint index entries 402', the updated log segment is written as a log segment in an updated persistent fingerprint index 110'.

The process above is re-iterated for the next portion (e.g., next log segment) of the persistent fingerprint index 110.

In Merge 2, the total number of fingerprint index entries to be merged in the persistent fingerprint index 110 is N+N'. Once merged, the N+N' fingerprint index entries are in sorted order in the persistent fingerprint index 110.

Note that adding new fingerprint index entries into a log structured hash table in a random fashion can be inefficient. For example, as each fingerprint index entry is inserted, the sizes and/or boundaries of buckets of the log structured hash table may have to be modified. Modifying sizes and/or boundaries of buckets can be processing intensive and can consume a large bandwidth of the storage system 102.

Pre-allocating storage space for the buckets of the log structured hash table can also lead to inefficiencies, since the pre-allocation can be based on estimated expected amounts of data and the pre-allocated space of a bucket can be larger than expected to provide some safety margin to accommodate more data. As a result, pre-allocating storage space for buckets can result in wasted memory and/or persistent storage usage.

In accordance with some implementations of the present disclosure, merging in-memory fingerprint index entries into the persistent fingerprint index 110 can be based on a determination of a bucket span (discussed further below) that is based on the actual number of fingerprint index entries (in the memory 104 as well as in the persistent fingerprint index 110) that are to be merged.

Also, as additional fingerprint index entries are produced in the sync buffer for new incoming data units, the additional fingerprint index entries are merged with the previously populated fingerprint index entries in the persistent fingerprint index 110. Merging the additional fingerprint index entries into the persistent fingerprint index 110 causes the size of the log structured hash table to grow.

In some examples, when the log structured hash table reaches a capacity of about 90% (or some other X % value), the merging of additional fingerprint index entries into the persistent fingerprint index 110 can encounter a bucket full condition in which a bucket for the new fingerprint index entry is full. The log structured hash table reaching a capacity of about 90% means that the log structured hash table is about 90% filled with fingerprint index entries. In accordance with some implementations of the present disclosure, to reduce the occurrence of bucket full conditions, the merge engine 109 can resize the log structured hash table in response to detecting that the log structured hash table has reached 90% (or other X %) capacity. Resizing the log structured hash table can include adding additional leaf blocks to the log structured hash table, or growing the size of a leaf block.

Figure 5:
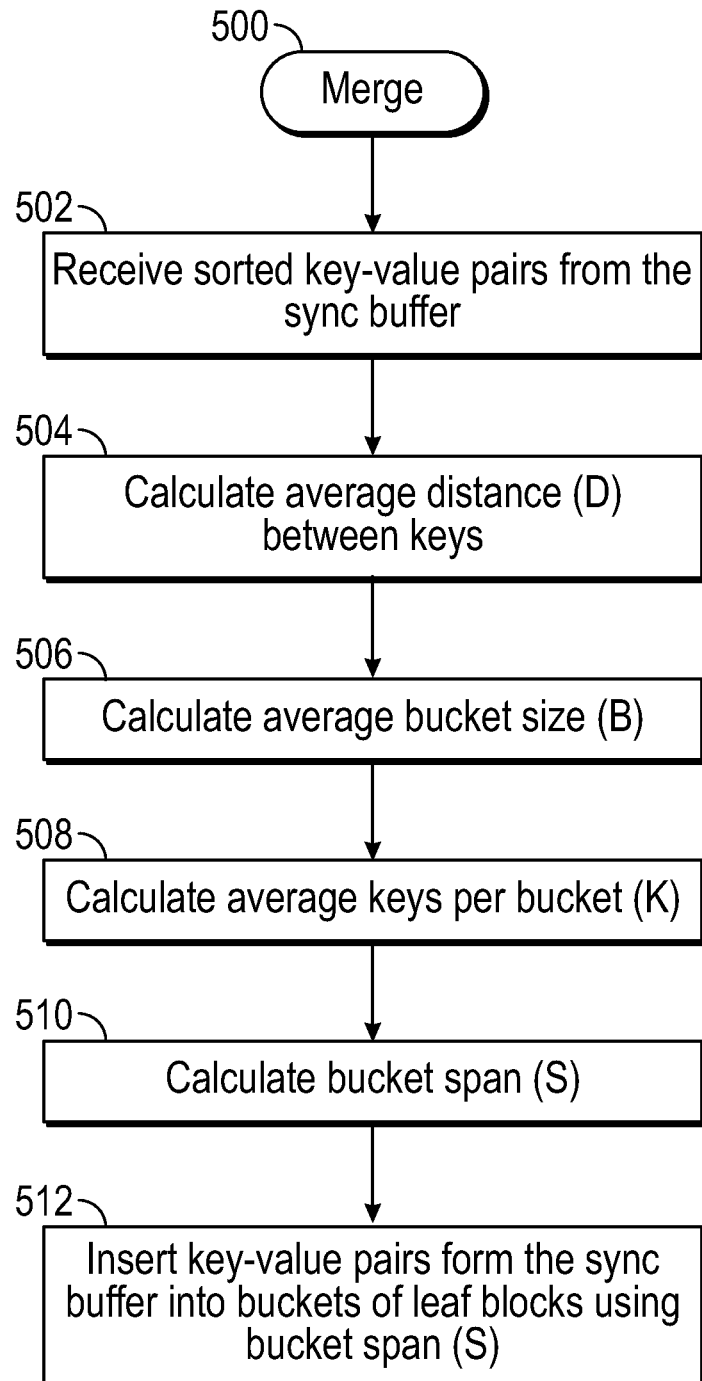
FIG. 5 is a flow diagram of a merging process according to some examples.

Referring further to FIG. 5, an example merge process 500 is shown, where the merge process 500 can include Merge 1 or Merge 2 of FIG. 4. The merge process 500 can be performed by the merge engine 109 of FIG. 1, for example.

The merge engine 109 receives (at 502) a number of sorted key-value pairs from the sync buffer (e.g., 108 in FIG. 1). Assuming that Merge 1 is being performed, the number of sorted key-value pairs is N.

The merge engine 109 calculates (at 504) the average distance (D) between any two keys (fingerprints), according to the following:

$$D = \frac{2^{64} - 1}{N}. \qquad \text{(Eq. 1)}$$

In Eq. 1, it is assumed that each key (fingerprint) is 64 bits in length, such that the key space is $2^{64}-1$.

The merge engine 109 calculates (at 506) an average bucket size (B) as follows:

$$B = \frac{\text{Target Block Size}}{\text{Number of Buckets Per Block}}. \qquad \text{(Eq. 2)}$$

In Eq. 2, Target Block Size represents a target size of a leaf block, which can be a pre-specified size such as 8 KB or a different value. Note that a leaf block can dynamically grow in size beyond Target Block Size. Number of Buckets Per Block represents a number of buckets per block (e.g., 4 or a different predefined number).

The merge engine 109 calculates (at 508) the average number of keys per bucket (K) using the average bucket size (B) as follows:

$$K = \frac{B}{\text{Fingerprint Size} + SBN \text{ Size}}. \qquad \text{(Eq. 3)}$$

In Eq. 3, the Fingerprint Size is a specified value, such as 8 bytes or a different value, which represents the size of a partial fingerprint. SBN Size is also a specified value, such as 8 bytes or a different value, which represents the size of an SBN.

The merge engine 109 computes (at 510) a bucket span (S) that is the distance between the first key and the last key in a bucket (410 in FIG. 4). The bucket span (S) is computed as follows:

$$S = D \cdot (K-1). \qquad \text{(Eq. 4)}$$

In Eq. 4, D represents the average distance between any two keys computed according to Eq. 1, and K represents the average number of keys per bucket computed according to Eq. 3. The bucket span (S) is represented as a number of bytes between the first key and the last key of a bucket.

The merge engine 109 inserts (at 512) key-value pairs from the sync buffer into buckets of leaf blocks using the bucket span (S).

The following provides an example of which key-value pairs go into which buckets of a first leaf block of the persistent fingerprint index 110. The 4 buckets of the first leaf block (block 0) is represented as B0, B1, B2, and B3.

B0: 0≤fp≤(S−1)
B1: S≤fp≤(2S−1)
B2: 2S≤fp≤(3S−1)
B3: 3S≤fp≤(4S−1)

In the foregoing, fp represents a key value, i.e., the value of the partial fingerprint. Thus, key-value pairs with partial fingerprint values, fp, between 0 and S−1 are placed in bucket B0, key-value pairs with fp values between S and 2S−1 are placed in bucket B1, and so forth. Once the corresponding key-value pairs have been placed into the respective buckets B0, B1, B2, and B3, leaf block 0 can be written to the log structured hash table that contains the persistent fingerprint index 110 in the persistent storage 112.

For the next leaf block (block B1), key-value pairs from the sync buffer are populated into buckets B0 to B3 of leaf block 1 as follows:

B0: 4S≤fp≤(5S−1)
B1: 5S≤fp≤(6S−1)
B2: 6S≤fp≤(7S−1)
B3: 7S≤fp≤(8S−1)

The insertion (512) of key-value pairs from the sync buffer into respective buckets of leaf blocks continue until the end of the sync buffer is reached.

Once the number of key-value pairs have been inserted into the persistent fingerprint index 110, a bucket index can be computed as follows:

$$\text{Bucket Index} = \frac{fp}{S}, \qquad \text{(Eq. 5)}$$

where fp represents the partial fingerprint value. The block index is computed as follows:

$$\text{Block Index} = \frac{\text{Bucket Index}}{\text{Number of Buckets per Block}}. \qquad \text{(Eq. 6)}$$

The block index is used to retrieve a block reference 142 from the in-memory indirect block 140, and the retrieved block reference identifies the location of the corresponding leaf block in the persistent fingerprint index 110. The bucket index is used to retrieve the bucket in the leaf block at the identified location.

After Merge 1 (306), the persistent fingerprint index 110 includes leaf blocks populated with N key value pairs.

In Merge 2, it is assumed that the sync buffer has been filled with additional N' fingerprint index entries.

In Merge 2, the total number of key-value pairs is N+N', since there are N key-value pairs already populated in the persistent fingerprint index 110, and N' key-value pairs in the sync buffer.

Note that Merge 2 involves a rewrite of the entire persistent fingerprint index 110. While the merge is ongoing, another sync buffer in the memory 104 of FIG. 1 can continue to receive incoming fingerprint index entries.

For Merge 2, a similar merge process as shown in FIG. 5 is performed, except that the average distance (D') for any two of the N+N' keys is computed as:

$$D' = \frac{2^{64} - 1}{N + N'}. \qquad \text{(Eq. 7)}$$

The average keys per bucket is still represented as K (as computed using Eq. 3), and the new bucket span (S') is computed as follows:

$$S'=D'\cdot(K-1). \qquad \text{(Eq. 8)}$$

The insertion of the N' additional key-value pairs from the sync buffer into the buckets of the leaf blocks of the persistent fingerprint index 110 uses the new bucket span S".

Once the N' additional key-value pairs have been merged with the N key-value pairs in the persistent fingerprint index 110, the bucket index can be computed as follows:

$$\text{Bucket Index} = \frac{fp}{S'}. \qquad \text{(Eq. 9)}$$

The block index can be computed using Eq. 6.

The foregoing describes examples of merging fingerprint index entries from the in-memory sync buffer into the persistent fingerprint index 110 that is a log structured hash table.

In further examples, an existing B-tree persistent fingerprint index stored in the persistent storage 112 can be updated to a fingerprint index arranged as a log structured has table. The updating can be performed by an update engine 602 shown in FIG. 6. The update engine 602 can be part of the storage controller 103, or part of a different system. Additionally, the update engine 602 can be separate from or included in the deduplication engine 118 of FIG. 1.

Figure 6:
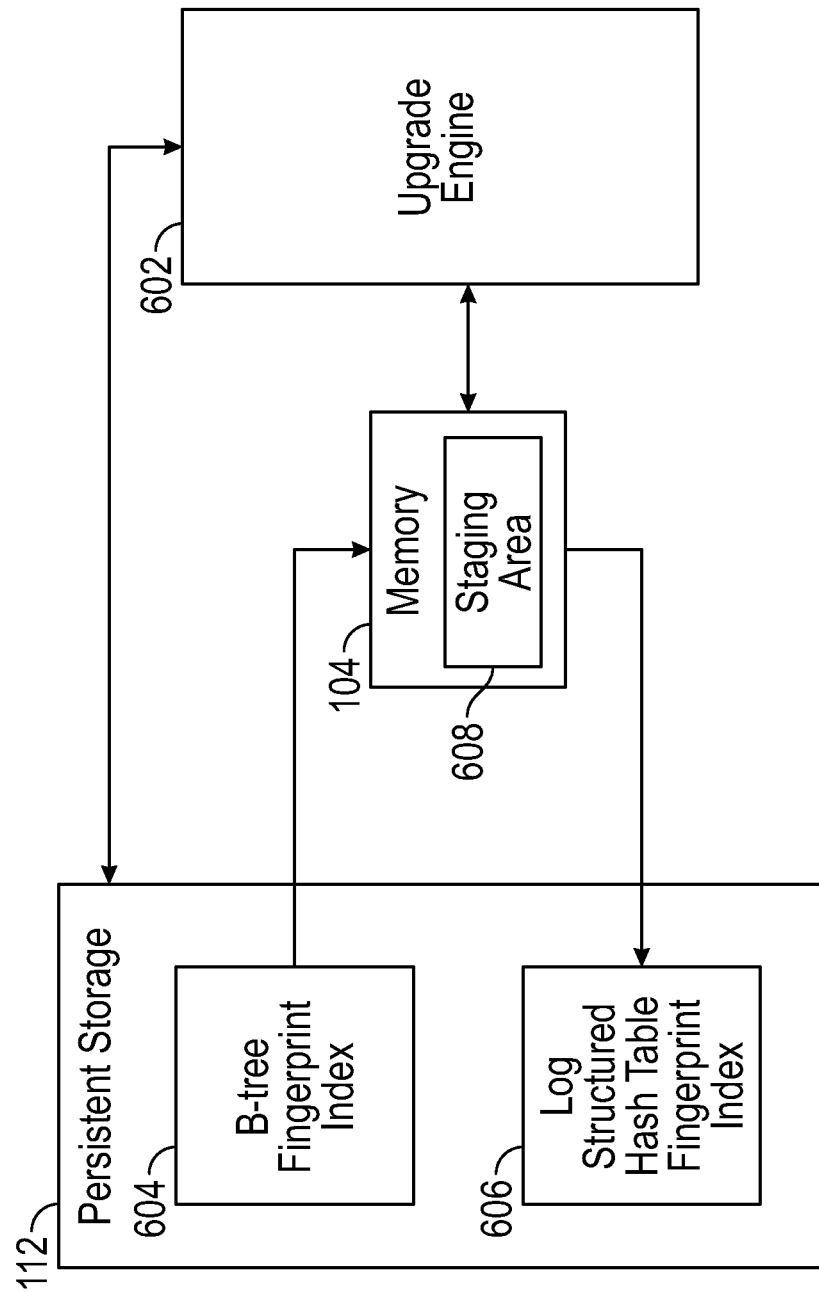
FIG. 6 is a block diagram of an arrangement including an upgrade engine to upgrade a B-tree fingerprint index to a log structured hash table fingerprint index, according to some examples.

As shown in FIG. 6, the update engine 602 retrieves fingerprint index entries from a B-tree fingerprint index 604 stored in the persistent storage 112. The updating performed by the update engine 602 can follow a process similar to the merge process shown in FIG. 5, except that fingerprint index entries of the B-tree fingerprint index 604 are staged into a staging area 608 in the memory 104, for insertion into a log structured hash table fingerprint index 606 in the persistent storage 112.

Figure 7:
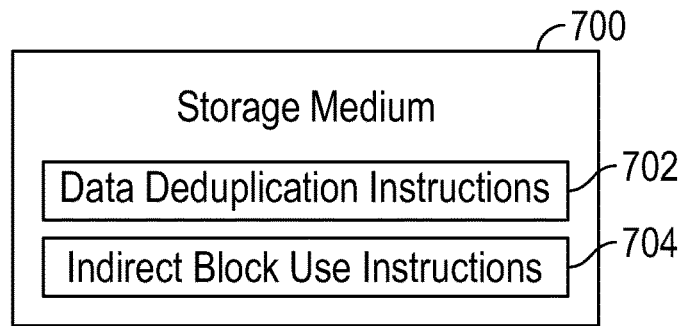
FIGS. 7, 10, and 15 are block diagrams of storage media storing machine-readable instructions according to various examples.

3. Use of Indirect Block to Access Fingerprint Index Entries in the Persistent Fingerprint Index FIG. 7 is a block diagram of a non-transitory machine-readable or computer-readable storage medium 700 that stores machine-readable instructions that upon execution cause a system (e.g., the storage system 102) to perform specified tasks.

The machine-readable instructions include data deduplication instructions 702 to perform data deduplication using a deduplication fingerprint index (e.g., the persistent fingerprint index 110) in a hash data structure (e.g., the log structured hash table discussed above) including a plurality of leaf blocks, where the hash data structure is stored in persistent storage, and a leaf block of the plurality of leaf blocks includes fingerprints computed based on content of respective data units.

As used here, a "hash data structure" can refer to a data structure that stores keys (e.g., the partial fingerprints) in a sorted order (e.g., ascending order, descending order, etc.).

The machine-readable instructions further include indirect block use instructions 704 to use an indirect block (e.g., 140 in FIG. 1) in a memory (e.g., 104 in FIG. 1) to access a given leaf block of the plurality of leaf blocks in the hash data structure, the indirect block containing block references to leaf blocks of the hash data structure containing the deduplication fingerprint index, and the block references indicating storage locations of the plurality of leaf blocks in the persistent storage.

In some examples, the indirect block does not include any of the fingerprints computed based on the content of the respective data units. In further examples, the indirect block does not include size information regarding sizes of the blocks of the hash data structure.

In some examples, the hash data structure is a log structured hash table, and to update the log structured hash table, either buckets of the log structured hash table are grown in size, leaf blocks of the log structured hash table are grown in size, or new leaf blocks are added to the log structured hash table.

In some examples, the log structured hash table includes segments, each segment of the segments including multiple blocks (leaf blocks and/or indirect blocks).

In some examples, appending a new leaf block or a new indirect block to the log structured hash table can include appending a new segment including the new leaf block or new indirect block to a boundary (end or front) of the log structured hash table. FIG. 2 shows an example where a new segment is added (at 212) to the end of the log structured hash table.

In some examples, the hash data structure includes header information (e.g., block header information 216 shown in FIG. 2) indicating a number of fingerprints included in each bucket of the plurality of buckets of a given leaf block.

In some examples, a leaf block of the plurality of leaf blocks in the hash data structure is accessible using the indirect block without performing a binary search of the deduplication fingerprint index.

In some examples, for a data unit, a respective fingerprint is computed based on the data unit, and a respective block index is computed based on the respective fingerprint, the respective block index referring to a block of the deduplication fingerprint index in the hash data structure. The respective block index is used to look up a block reference (e.g., 142 in FIG. 1) in the indirect block.

In some examples, the plurality of leaf blocks in the hash data structure are variable sized leaf blocks.

Figure 8:
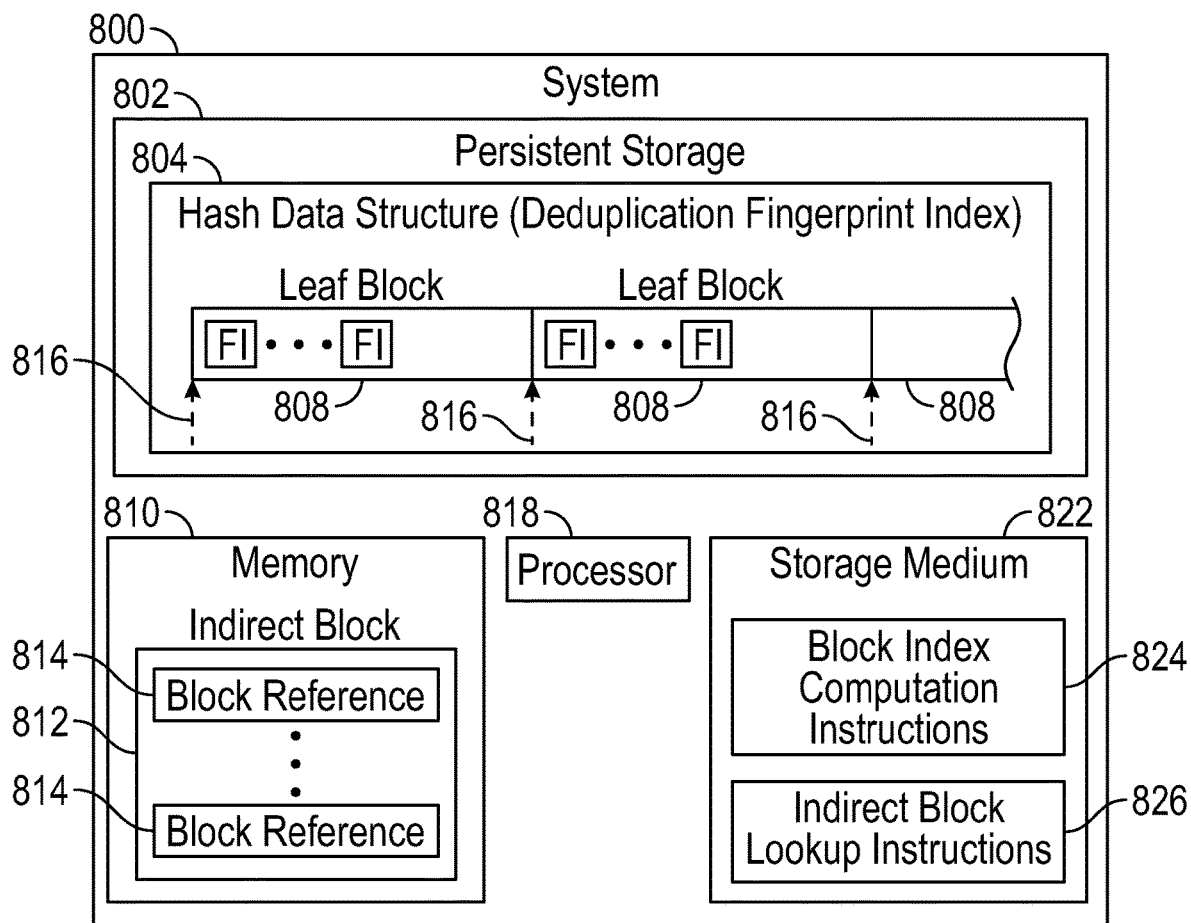
FIGS. 8, 11, and 16 are block diagrams of systems according to various examples.

FIG. 8 is a block diagram of a system 800 according to some examples. The system 800 can include a storage system (e.g., 102 in FIG. 1) or an arrangement of multiple storage systems.

The system 800 includes persistent storage 802 to store a hash data structure 804 including a deduplication fingerprint index. The hash data structure 804 includes a plurality of leaf blocks 808, and a leaf block 808 of the plurality of leaf blocks 808 including fingerprints (FI) computed based on content of respective data units. The fingerprints (FI) are included in the deduplication fingerprint index.

The system 800 further includes a memory 810 to store an indirect block 812 containing block references 814 indicating storage locations 816 of leaf blocks 808 of the hash data structure 804 containing the deduplication fingerprint index.

The system 800 further includes a hardware processor 818 to execute machine-readable instructions stored on a machine-readable storage medium 822 to perform specified tasks.

A hardware processor can include a microprocessor, a core of a multi-core microprocessor, a microcontroller, a programmable integrated circuit, a programmable gate array, a digital signal processor, or another hardware processing circuit. A hardware processor executing machine-readable instructions can refer to a single hardware processor executing the machine-readable instructions or multiple hardware processors executing the machine-readable instructions.

The machine-readable instructions in the storage medium 822 include block index computation instructions 824 to compute block indexes based on respective fingerprints for the deduplication fingerprint index. The machine-readable instructions further include indirect block lookup instructions 826 to use the computed block indexes to look up respective block references in the indirect block.

The processor 818 is to execute instructions to access a given leaf block 808 of the plurality of leaf blocks 808 in the hash data structure 804 using a block reference 814 retrieved from the indirect block 812.

Figure 9:
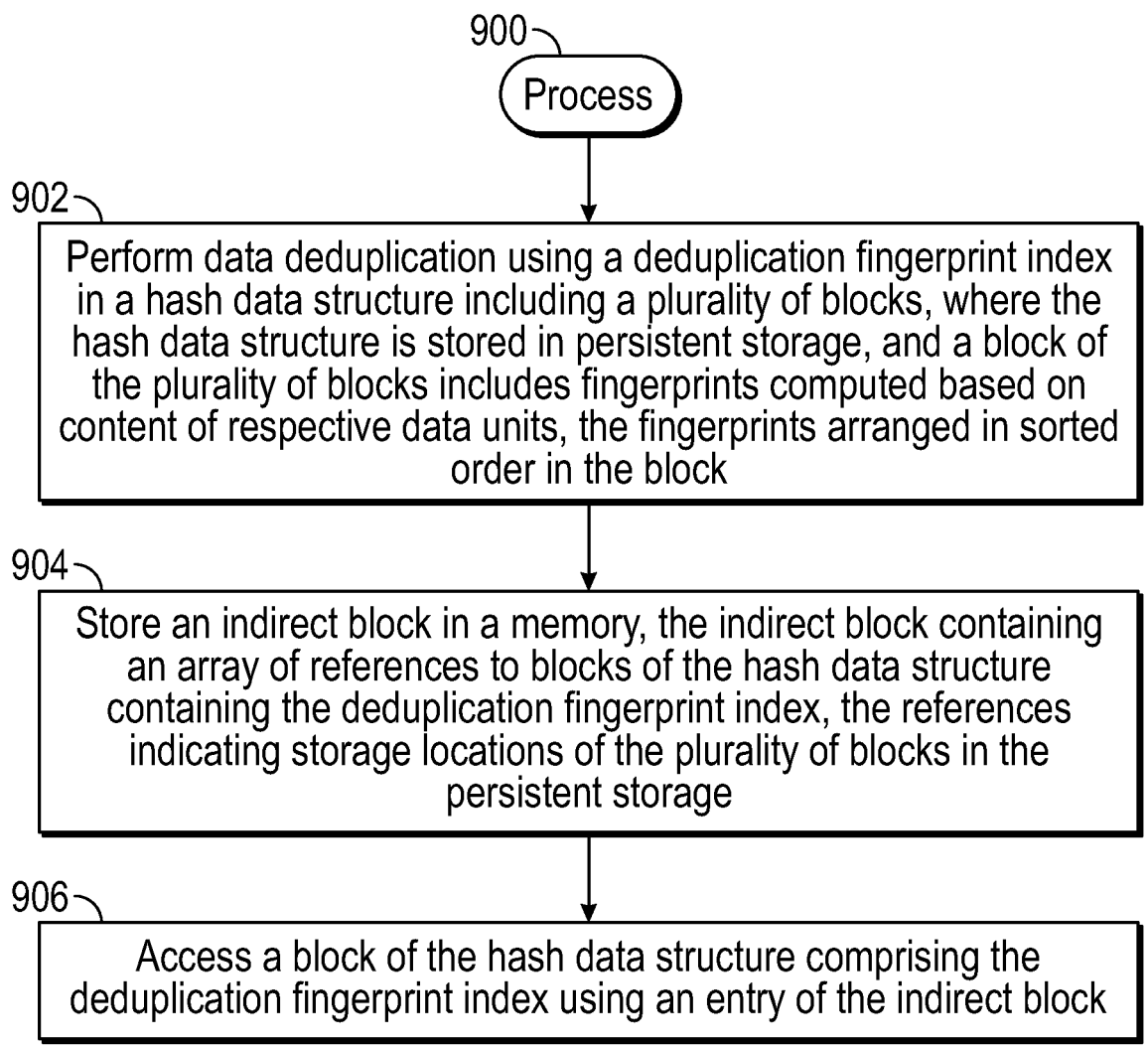
FIGS. 9, 12, and 17 are flow diagrams of processes according to various examples.

FIG. 9 is a flow diagram of a process 900 of a system, such as the storage system 102. Although FIG. 9 shows a specific order of tasks, it is noted that in other examples, the tasks can be performed in a different order, or alternatively or additionally, some tasks can be omitted and/or other tasks can be added.

The process 900 includes performing (at 902) data deduplication using a deduplication fingerprint index in a hash data structure including a plurality of blocks, where the hash data structure is stored in persistent storage, and a block of the plurality of blocks includes fingerprints computed based on content of respective data units, the fingerprints arranged in sorted order in the block.

The process 900 further includes storing (at 904) an indirect block in a memory, the indirect block containing an array of references to blocks of the hash data structure containing the deduplication fingerprint index, the references indicating storage locations of the plurality of blocks in the persistent storage.

The process 900 further includes accessing (at 906) a block of the hash data structure comprising the deduplication fingerprint index using an entry of the indirect block.

4. Updating the Persistent Fingerprint Index or Upgrading to the Persistent Fingerprint Index FIG. 10 is a block diagram of a non-transitory machine-readable or computer-readable storage medium 1000 that stores machine-readable instructions that upon execution cause a system (e.g., the storage system 102) to perform specified tasks.

Figure 10:
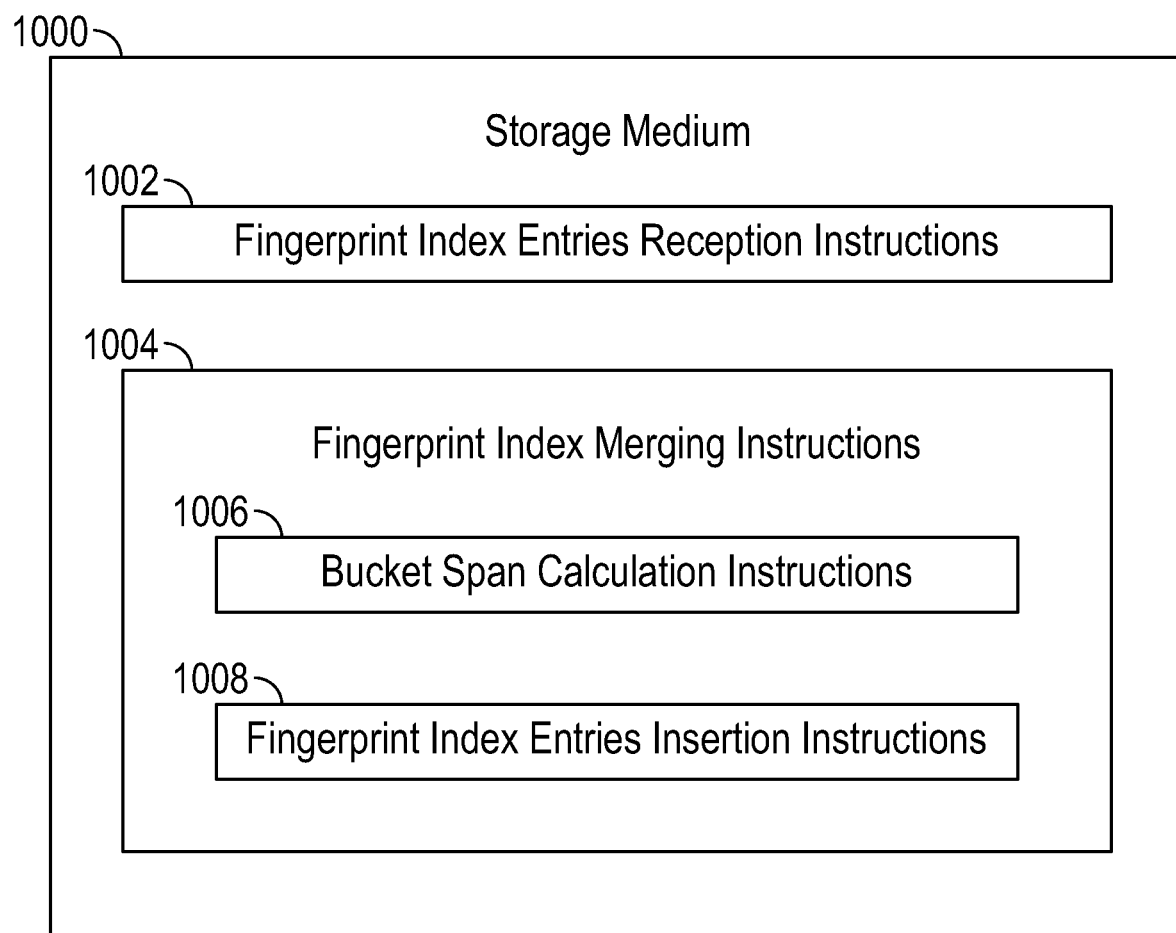

The machine-readable instructions of FIG. 10 include fingerprint index entries reception instructions 1002 to receive, in a sync buffer (e.g., 108 in FIG. 1) stored in a memory (e.g., 104 in FIG. 1), fingerprint index entries for respective data units received by the system.

The machine-readable instructions of FIG. 10 further include fingerprint index entries merging instructions 1004 to merge the fingerprint index entries in the sync buffer with fingerprint index entries of a persistent fingerprint index (e.g., 110 in FIG. 1) in a hash data structure stored in persistent storage, the hash data structure including a plurality of buckets. The fingerprint index entries merging instructions 1004 include bucket span calculation instructions 1006 to calculate a target span (e.g., S according to Eq. 4) of fingerprints per bucket, and fingerprint index entries insertion instructions 1008 to insert, in order from the sync buffer and the persistent fingerprint index, fingerprint index entries into the plurality of buckets of the hash data structure, where a number of fingerprint index entries inserted into each bucket of the plurality of buckets is based on the target span of fingerprints per bucket.

In some examples, the target span of fingerprints per bucket represents a range of fingerprint values of the fingerprints per bucket, and the calculating of the target span of fingerprints per bucket is based on a total number of fingerprint index entries contained in the sync buffer and in the persistent fingerprint index prior to the merging.

In some examples, the machine-readable instructions of FIG. 10 maintain the fingerprint index entries in the sync buffer in sorted order of values of fingerprints in the fingerprint index entries in the sync buffer.

In some examples, the fingerprint index entries in the sync buffer are arranged in a B-tree.

In some examples, the calculating of the target span of fingerprints per bucket includes calculating an average distance (e.g., D according to Eq. 1) between fingerprints based on a total number of fingerprints in the sync buffer and in the persistent fingerprint index.

In some examples, the hash data structure includes a plurality of leaf blocks, and each leaf block of the plurality of leaf blocks includes multiple buckets, and the calculating of the target span of fingerprints per bucket includes calculating a number (e.g., K according to Eq. 3) of fingerprint index entries per bucket based on a target size of each block of the plurality of blocks, and computing the target span of fingerprints per bucket based on the average distance between fingerprints and the number of fingerprint index entries per bucket.

In some examples, the machine-readable instructions of FIG. 10 perform the merging by generating a first bucket of the plurality of buckets of the hash data structure, the first bucket associated with a first span of fingerprints based on the target span of fingerprints per bucket, and inserting, into the first bucket from the sync buffer and the persistent fingerprint index, fingerprint index entries that have fingerprints with fingerprint values falling in the first span of fingerprints.

In some examples, the machine-readable instructions of FIG. 10 perform the merging by further generating a second bucket of the plurality of buckets of the hash data structure, the second bucket associated with a second span of fingerprints based on the target span of fingerprints per bucket, the second span of fingerprints different from the first span of fingerprints, and inserting, into the second bucket from the sync buffer and the persistent fingerprint index, fingerprint index entries that have fingerprints with fingerprint values falling in the second span of fingerprints.

In some examples, the machine-readable instructions of FIG. 10 compute a given fingerprint based on an incoming data unit, compute a bucket index (e.g., according to Eq. 5) based on the given fingerprint and the target span of fingerprints per bucket, and, as part of a deduplication process for the incoming data unit, access a bucket, corresponding to the bucket index, of the persistent fingerprint index.

In some examples, during the merging that accesses the sync buffer (e.g., 108 in FIG. 1), the machine-readable instructions of FIG. 10 receive further incoming data units, and insert fingerprint index entries corresponding to the further incoming data units into a further sync buffer (e.g., 106 in FIG. 1) in the memory.

After the merging, the machine-readable instructions of FIG. 10 merge the fingerprint index entries in the further sync buffer into the persistent fingerprint index.

In some examples, the merging of the fingerprint index entries in the further sync buffer into the persistent fingerprint index is initiated responsive to the further sync buffer becoming full.

Figure 11:
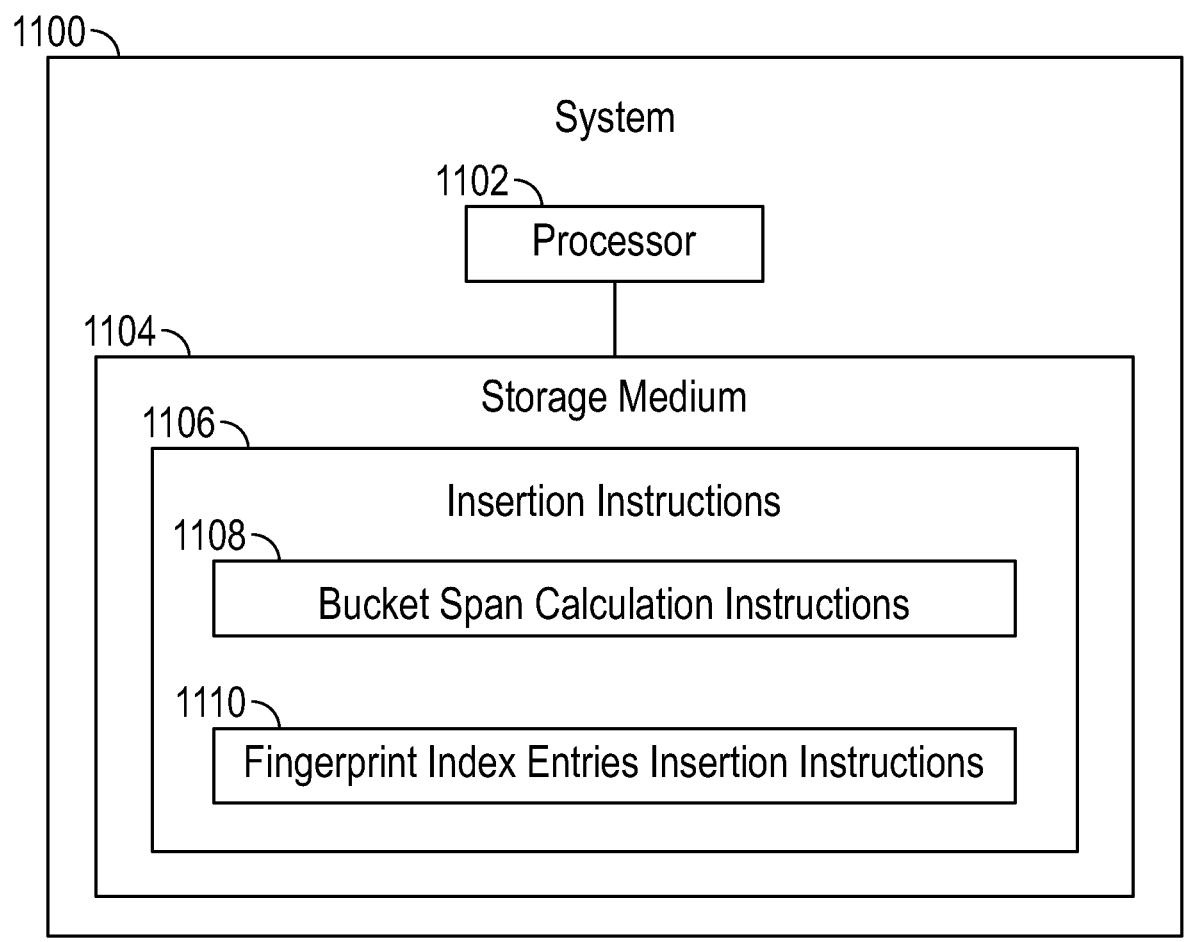

FIG. 11 is a block diagram of a system 1100 according to some examples. The system 1100 can include a storage system (e.g., 102 in FIG. 1) or an arrangement of multiple storage systems.

The system 1100 includes a hardware processor 1102 (or multiple hardware processors).

The system 1100 further includes a storage medium 1104 storing machine-readable instructions to upgrade a B-tree of fingerprint index entries to a fingerprint index in a hash table.

The machine-readable instructions of the storage medium 1104 are executable on the hardware processor 1102 to perform various tasks. Machine-readable instructions executable on a hardware processor can refer to the instructions executable on a single hardware processor or the instructions executable on multiple hardware processors.

The machine-readable instructions of the storage medium 1104 include insertion instructions 1106 to insert the fingerprint index entries in the B-tree into a plurality of buckets of a hash data structure containing the fingerprint index stored in persistent storage. The insertion instructions 1106 include bucket span calculation instructions 1108 to calculate a target span of fingerprints per bucket based on a number of the of the fingerprint index entries in the B-tree. The insertion instructions 1106 further include fingerprint index entries insertion instructions 1110 to insert, in order from the B-tree, the fingerprint index entries into the plurality of buckets of the hash data structure, wherein a number of fingerprint index entries inserted into each bucket of the plurality of buckets is based on the target span of fingerprints per bucket.

Figure 12:
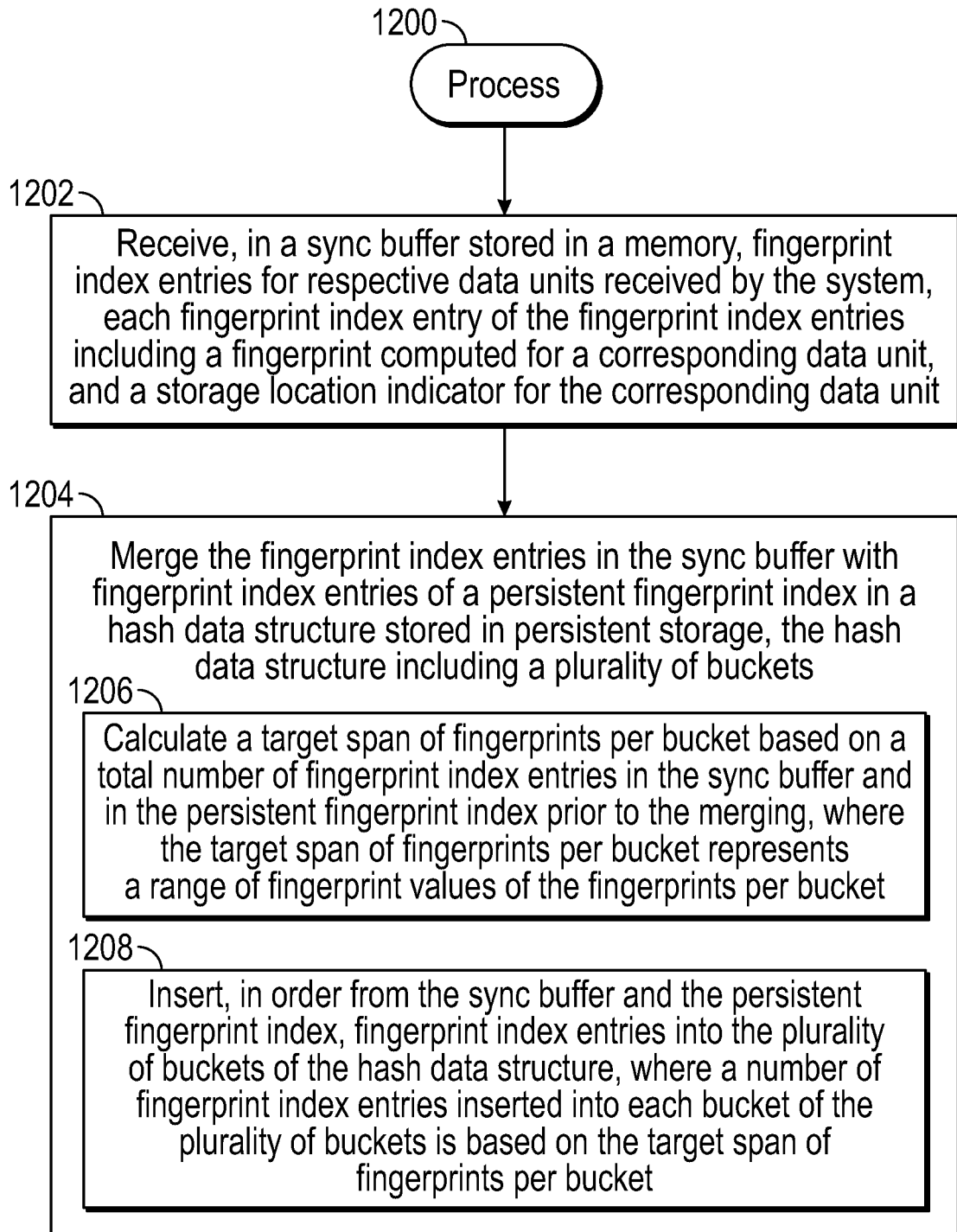

FIG. 12 is a flow diagram of a process 1200 according to some examples. Although FIG. 12 shows a specific order of tasks, it is noted that in other examples, the tasks can be performed in a different order, or alternatively or additionally, some tasks can be omitted and/or other tasks can be added.

The process 1200 includes receiving (at 1202), in a sync buffer stored in a memory, fingerprint index entries for respective data units received by the system, each fingerprint index entry of the fingerprint index entries including a fingerprint computed for a corresponding data unit, and a storage location indicator for the corresponding data unit.

The process 1200 includes merging (at 1204) the fingerprint index entries in the sync buffer with fingerprint index entries of a persistent fingerprint index in a hash data structure stored in persistent storage, the hash data structure including a plurality of buckets. The merging 1204 includes calculating (at 1206) a target span of fingerprints per bucket based on a total number of fingerprint index entries in the sync buffer and in the persistent fingerprint index prior to the merging, where the target span of fingerprints per bucket represents a range of fingerprint values of the fingerprints per bucket. The merging 1204 further includes inserting (at 1208), in order from the sync buffer and the persistent fingerprint index, fingerprint index entries into the plurality of buckets of the hash data structure, where a number of fingerprint index entries inserted into each bucket of the plurality of buckets is based on the target span of fingerprints per bucket.

5. Variable Sized Blocks and Buckets

As noted further above, the leaf blocks and buckets of the log structured hash table can be variably sized. More specifically, the size of a bucket (if full) can be dynamically increased to accommodate more key-value pairs of fingerprint index entries for incoming data units. If a leaf block becomes full, the size of the leaf block can be dynamically increased from the target block size (e.g., 8 KB) up to a maximum block size (e.g., 16 KB).

FIGS. 13A-13E illustrate how buckets of a leaf block 1302 are filled with key-value pairs each containing a fingerprint and an associated storage location indicator.

The leaf block 1302 includes a block header information 1304 (similar to the block header information 216 discussed above, for example), and 4 buckets B0, B1, B2, and B3. In some examples, the leaf block 1302 is filled with key-value pairs from left to right (as indicated by arrow 1306). As a result, bucket B0 would be filled first, followed by bucket B1, and so forth.

Figure 13:
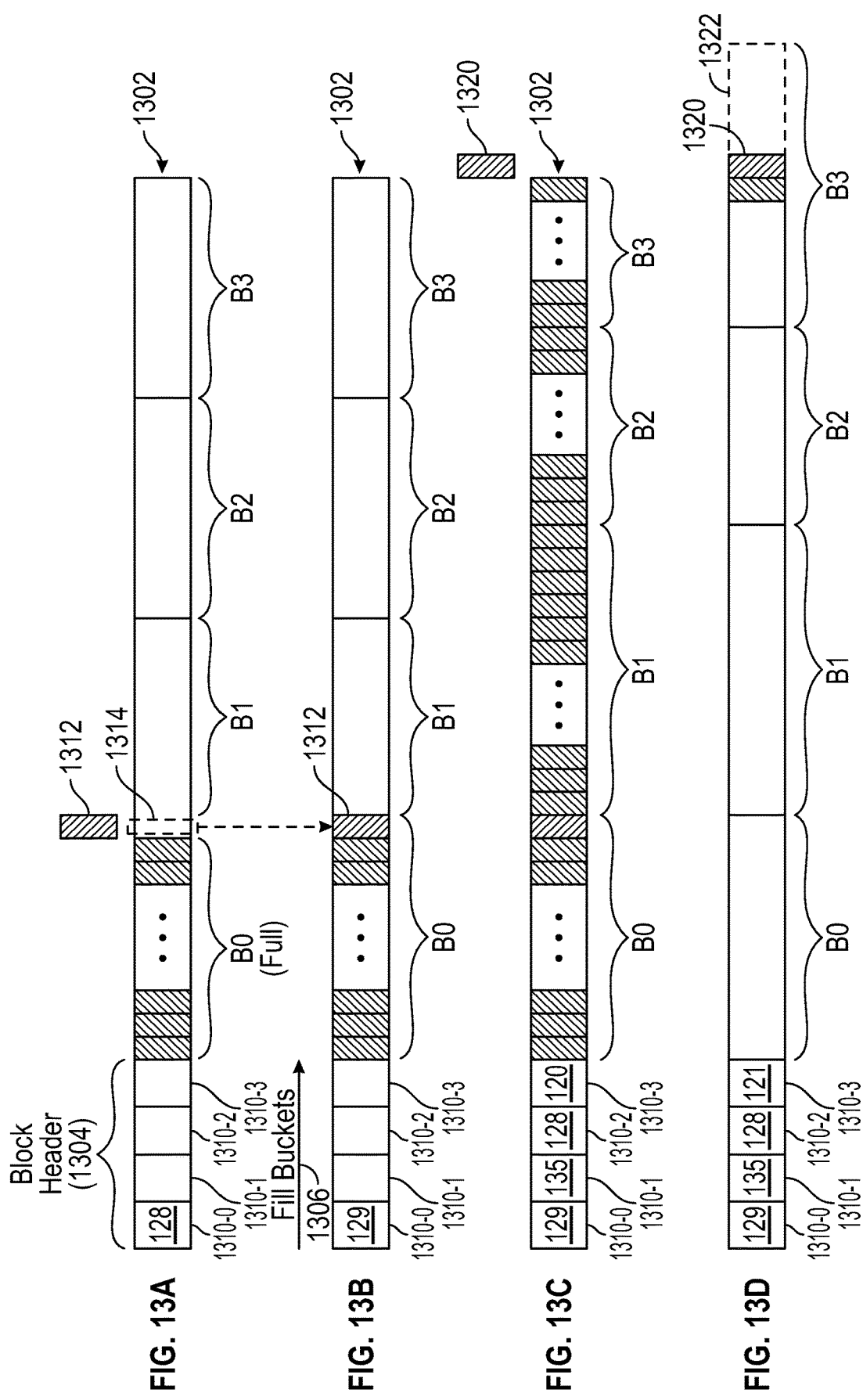
FIGS. 13A-13D illustrate an example of dynamically increasing sizes of buckets and blocks of a persistent fingerprint index, according to some examples.

In the example of FIG. 13A, it is assumed that bucket B0 is full, i.e., bucket B0 has a bucket full condition. As noted above, a "bucket full condition" can refer to a condition in which a bucket is completely filled with data of fingerprint index entries, or alternatively, a condition where the amount of space in the bucket that is available is insufficient to store a new fingerprint index entry (e.g., the size of the new fingerprint index entry exceeds the size of the available space in the bucket).

In FIG. 13A, the block header information 1304 includes four count entries 1310-0, 1310-1, 1310-2, and 1310-3 that indicate a number of key-value pairs contained in the respective buckets B0, B1, B2, and B3. The count entry 1310-0 contains a value specifying the number of key-value pairs in bucket B0, count entry 1310-1 contains a value specifying the number of key-value pairs in bucket B1, and so forth. Since bucket B0 is full, the count entry 1310-0 has a value of 128 specifying that the number of key-value pairs in bucket B0 is 128. The other count entries 1310-1, 1310-2, and 1310-3 are either set to null or have a zero value to indicate that there are no key-value pairs yet in buckets B1, B2, and B3.

FIG. 13A shows a new key-value pair 1312 that is to be added to bucket B0 in response to an incoming data unit. To allow addition of the new key-value pair 1312 to bucket B0, the merge engine 109 can "borrow" space 1314 from an adjacent bucket (B1) or from another bucket in the leaf block 1302. Borrowing a given amount of space ($S_B$) from another bucket for bucket B0 refers to increasing the size of bucket B0 by adding the given amount of space ($S_B$) to bucket B0, and decreasing the size of the other bucket by the given amount of space ($S_B$).

FIG. 13B shows the leaf block 1302 after the space 1314 of size $S_B$ has been added to bucket B0 and removed from bucket B1. FIG. 13B shows the new key-value pair 1312 added to bucket B0 after the space 1314 has been added to bucket B0.

Also, the count entry 1310-0 in the block header information 1304 is updated from 128 to 129 in FIG. 13B, to indicate that there are 129 key-value pairs in bucket B0 after the addition of the new key-value pair 1312.

By being able increase the size of a bucket by borrowing space from another bucket in the same leaf block, key-value pairs can be accommodated in full buckets. Uneven distribution of fingerprint values may lead to some buckets storing more key-value pairs than other buckets.

FIG. 13C shows that further key-value pairs have been added to the leaf block 1302 such that the leaf block 1302 has become full. In FIG. 13C, the count entry 1310-1 is set to 135 to indicate that bucket B1 has 135 key-value pairs (based on borrowing space from the adjacent bucket B2), and the count entry 1310-2 is set to 128 to indicate that bucket B2 has 128 key-value pairs (based on borrowing space from bucket B3 that bucket B2 lost due to bucket B1 borrowing space from bucket B2).

The count entry 1310-3 is set to 120 to indicate that bucket B3 has 120 key-value pairs.

FIG. 13C shows another new key-value pair 1320 that is to be added to bucket B3 in response to an incoming data unit, after the leaf block 1302 has become full. The leaf block being full refers to the leaf block not having sufficient space to accommodate another key-value pair.

In accordance with some implementations, the merge engine 109 is able to dynamically increase the size of the leaf block 1302, such as by an amount 1322 shown in FIG. 13D. The amount 1322 increased can be any incremental value such that the size of the original leaf block 1302 and the size of the added amount 1322 does not exceed the maximum block size (e.g., 16 KB).

Once the leaf block 1302 is increased in size, the new key-value pair 1320 can be added to bucket B3 that has also been increased in size by the amount 1322, as shown in FIG. 13D. The count entry 1310-3 is updated from 120 to 121 to indicate that another key-value pair has been added to bucket B3.

In some examples, when leaf blocks are set to the target block size (e.g., 8 KB), a specific compression ratio of data units is assumed. A data unit, or a collection of data units, can be compressed using a compression algorithm (e.g., an LZ4 compression algorithm or some other data compression algorithm). For example, on average, the compression applied can reduce the size of the data units by a compression ratio, such as 2×. 2× compression means that the size of the compressed data is two times less than the size of the uncompressed data.

In some scenarios, depending on the content of the data units, the compression ratio may be greater. For example, if the compression ratio is 4× (which means that the size of the compressed data is four times less than the size of the uncompressed data), then potentially the storage system 102 can store a larger number of data units, and correspondingly, the persistent fingerprint index 110 would contain a larger number of key-value pairs. As a result of the greater compression ratio, a leaf block that has the target block size (e.g., 8 KB) may not be able to accommodate the larger number of key-value pairs. To address the foregoing, the merge engine 109 is able to dynamically increase the size of the leaf block to store a larger number of key-value pairs.

By allowing the size of leaf blocks to increase, the total number of leaf blocks does not have to be increased to accommodate more key-value pairs.

If a leaf block reaches the maximum block size, then the leaf block is no longer allowed to increase in size, in which case the merge engine 109 can start dropping key-value pairs from the leaf block.

Figure 14:
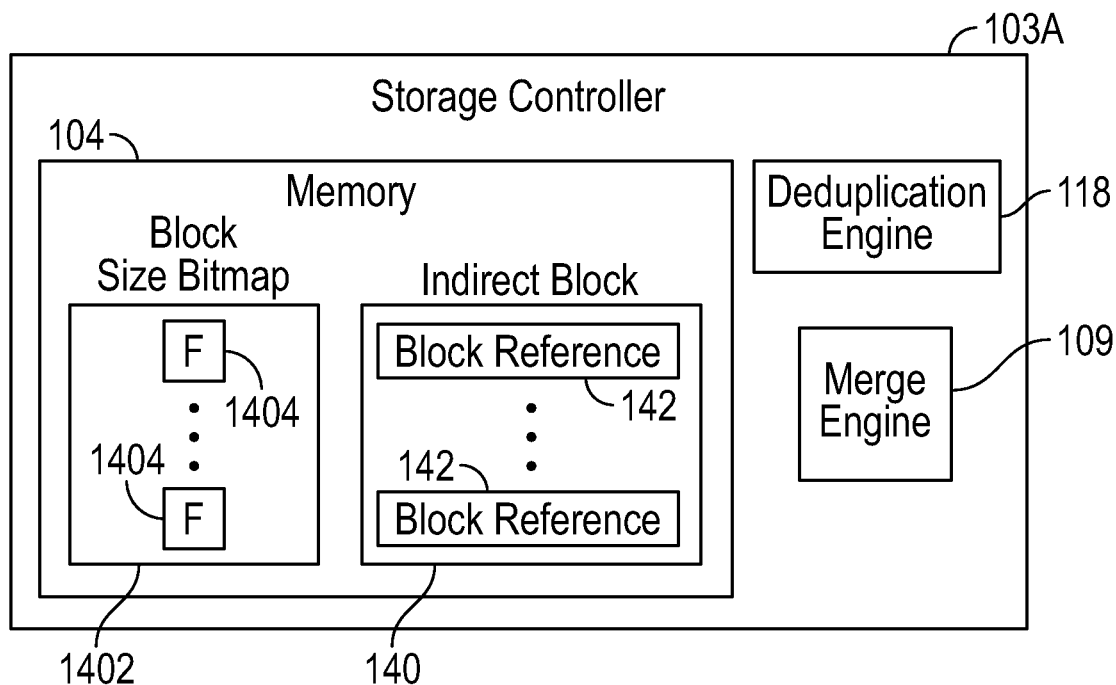
FIG. 14 is a block diagram of a storage controller according to further examples.

FIG. 14 is a block diagram showing a portion of a storage controller 103A according to further examples. The storage controller 103A is similar to the storage controller 103 of FIG. 1, except that a block size bitmap 1402 is stored in the memory 104 in association with the indirect block 140.

The block size bitmap 1402 includes flags 1404 that are settable to different values for indicating sizes of respective leaf blocks (such as leaf blocks referred to by corresponding block references 142 in the indirect block 140).

In some examples, each flag 1404 is a bit that is settable to a first value (e.g., 0) to indicate that the corresponding leaf block has the target block size (e.g., 8 KB), and a second value (e.g., 1) different from the first value to indicate that the corresponding leaf block has a size larger than the target block size.

The merge engine 109 can use a block index computed by the block index computation logic 122 of FIG. 1 as an index to a selected flag 1404 of the flags 1404 in the block size bitmap 1402. Different block index values select different flags of the flags 1404.

More generally, block size bitmap 1402 can refer to a block size data structure that includes indicators of corresponding sizes of leaf blocks.

In other examples, the flags 1404 can be included in the indirect block 140 instead of being included in a separate block size bitmap 1402. Metadata can be stored in the storage system that specifies storage locations of the indirect block 140 and the block size bitmap 1402, so that the storage controller 103A is able to retrieve the indirect block 140 and the block size bitmap 1402.

Figure 15:
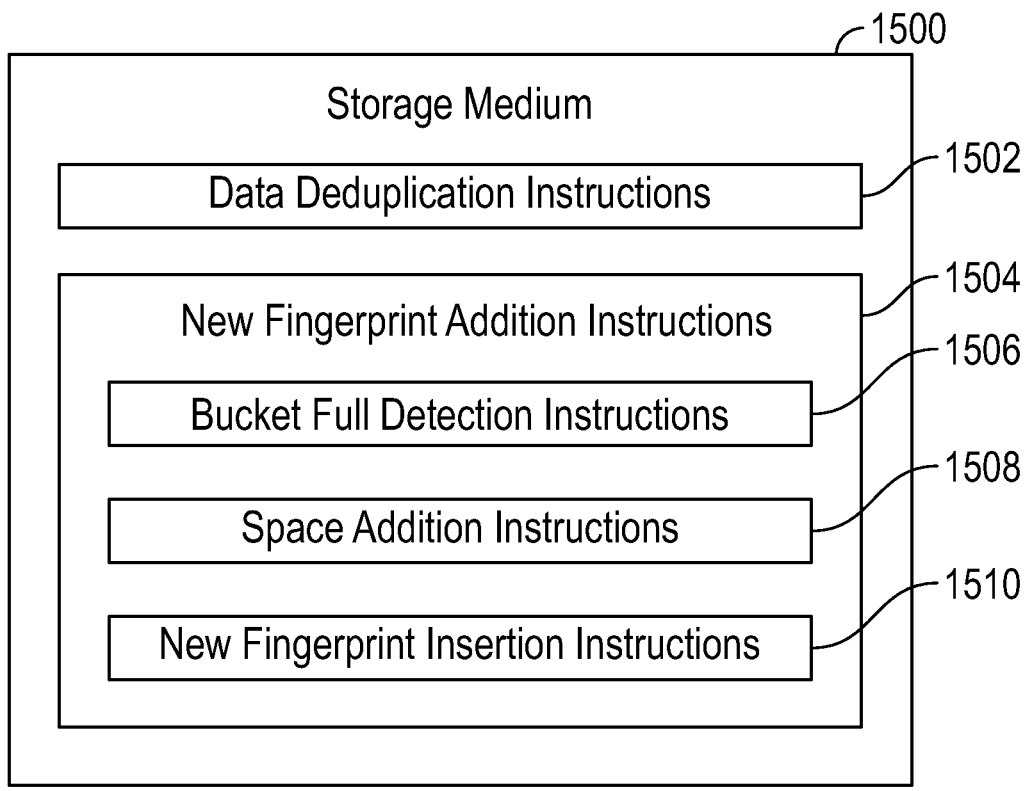

FIG. 15 is a block diagram of a non-transitory machine-readable or computer-readable storage medium 1500 that stores machine-readable instructions that upon execution cause a system (e.g., the storage system 102) to perform specified tasks.

The machine-readable instructions of the storage medium 1500 include data deduplication instructions 1502 to perform data deduplication using a fingerprint index including a plurality of buckets, each bucket of the plurality of buckets comprising entries associating fingerprints for data units to storage location indicators of the data units.

The machine-readable instructions of the storage medium 1500 further include new fingerprint addition instructions 1504 to add a new fingerprint to the fingerprint index. The new fingerprint addition instructions 1504 include bucket full detection instructions 1506 to detect that a corresponding bucket of the plurality of buckets is full.

The new fingerprint addition instructions 1504 further include space addition instructions 1508 to, in response to the detecting, add space to the corresponding bucket by taking a respective amount of space from a further bucket of the plurality of buckets.

The new fingerprint addition instructions 1504 further include new fingerprint insertion instructions 1510 to insert the new fingerprint into the corresponding bucket after increasing the size of the corresponding bucket.

In some examples, for adding a second new fingerprint to the fingerprint index, the machine-readable instructions of the storage medium 1500 detect that a second corresponding bucket of the plurality of buckets is full, and that a second respective block of the plurality of blocks is full, the second corresponding bucket being part of the second respective block. The machine-readable instructions of the storage medium 1500 increase a size of the second respective block to add the second new fingerprint to the second corresponding bucket.

In some examples, the machine-readable instructions of the storage medium 1500 determine that the second respective block is full based on all buckets of the second respective block being full.

In some examples, the machine-readable instructions of the storage medium 1500 set an indicator (such as in a collection of flags) to indicate that the size of the second respective block has been increased.

Figure 16:
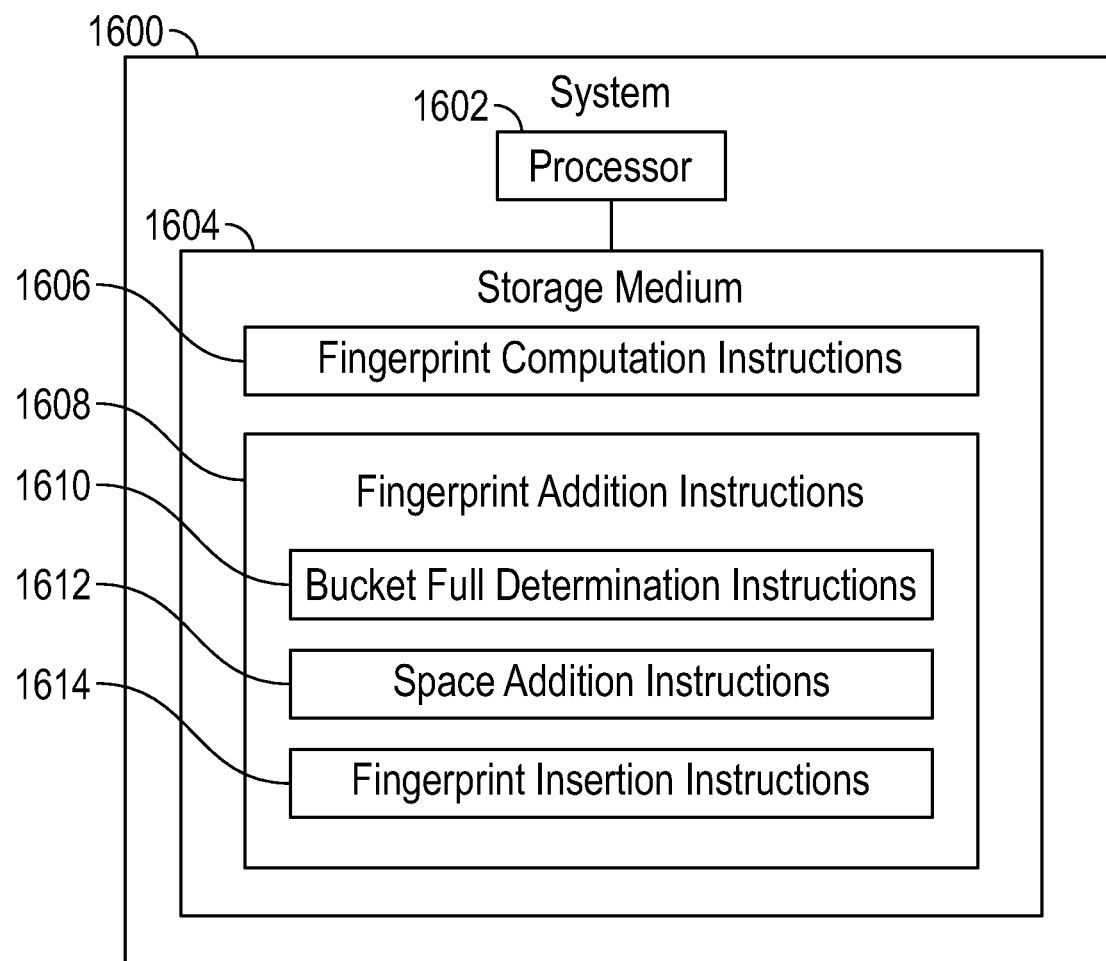

FIG. 16 is a block diagram of a system 1600 including a hardware processor 1602 (or multiple hardware processors). The system 1600 further includes a storage medium 1604 storing machine-readable instructions executable on the hardware processor 1602 to perform various tasks.

The machine-readable instructions of the storage medium 1604 include fingerprint computation instructions 1606 to compute a fingerprint based on an incoming data unit. The machine-readable instructions of the storage medium 1604 include fingerprint addition instructions 1608 to add the fingerprint to a fingerprint index including a plurality of buckets.

The fingerprint addition instructions 1608 include bucket full determination instructions 1610 to determine whether a corresponding bucket of the plurality of buckets is full. The fingerprint addition instructions 1608 include space addition instructions 1612 to, in response to determining that the corresponding bucket of the plurality of buckets is full, add space to the corresponding bucket by taking a respective amount of space from a further bucket of the plurality of buckets.

Figure 17:
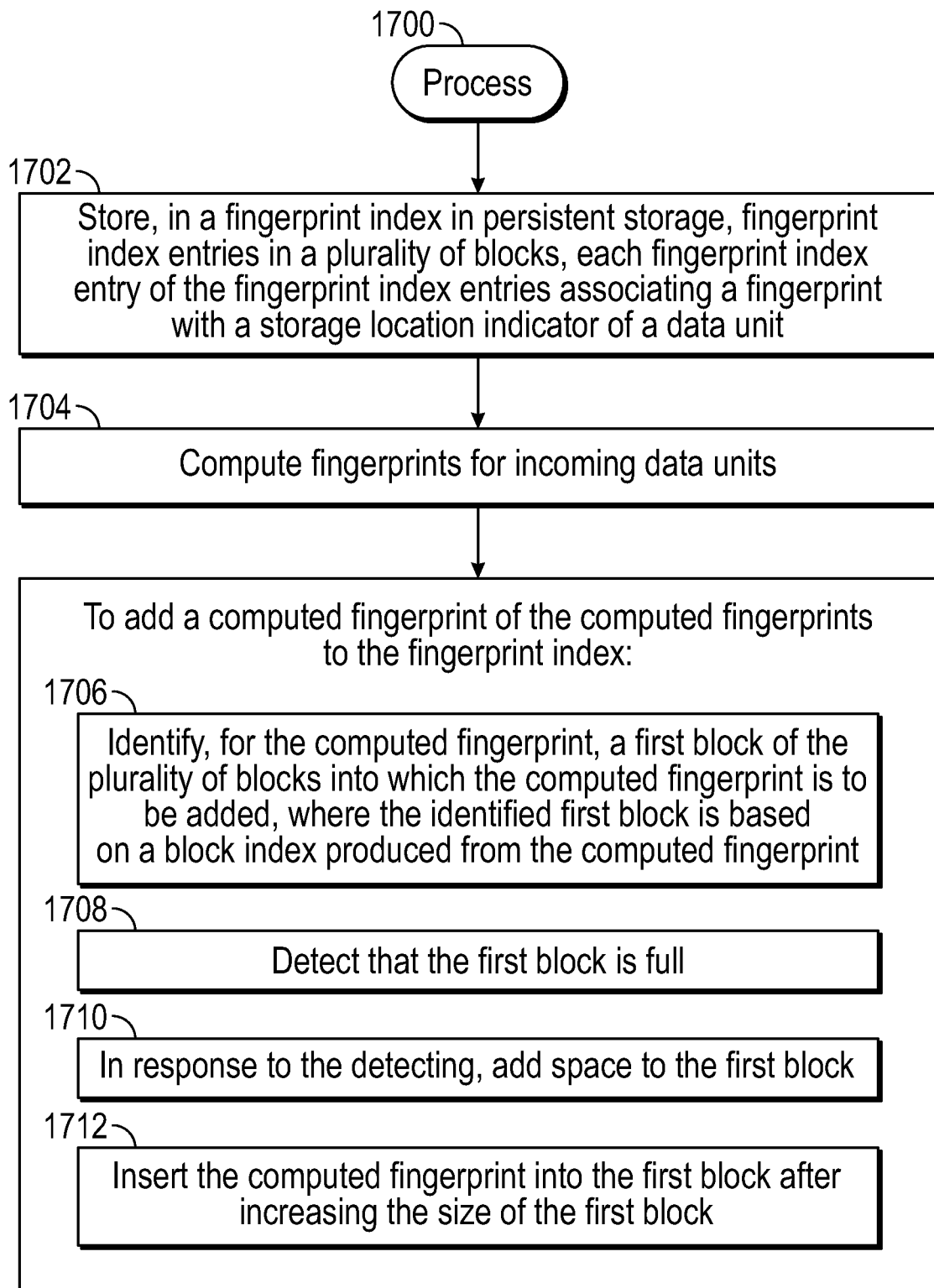

The fingerprint addition instructions 1608 include fingerprint insertion instructions 1614 to insert the fingerprint into the corresponding bucket after increasing the size of the corresponding bucket FIG. 17 is a flow diagram of a process 1700 of a system, such as the storage system 102 of FIG. 1.

The process 1700 includes storing (at 1702), in a fingerprint index in persistent storage, fingerprint index entries in a plurality of blocks, each fingerprint index entry of the fingerprint index entries associating a fingerprint with a storage location indicator of a data unit.

The process 1700 includes computing (at 1704) fingerprints for incoming data units.

To add a computed fingerprint of the computed fingerprints to the fingerprint index, the process 1700 includes identifying (at 1706), for the computed fingerprint, a first block of the plurality of blocks into which the computed fingerprint is to be added, where the identified first block is based on a block index produced from the computed fingerprint, detecting (at 1708) that the first block is full, in response to the detecting, adding (at 1710) space to the first block, and inserting (at 1712) the computed fingerprint into the first block after increasing the size of the first block.

6. Binning and Adaptive Sampling

As noted further above, in accordance with some implementations of the present disclosure, adaptive sampling of fingerprints added to the persistent fingerprint index is performed to dynamically adjust a proportion of incoming data units for which fingerprints are added to the persistent fingerprint index.

With partial sampling, a specified percentage (e.g., 80%, 50%, 40%, etc.) (less than all) of fingerprints for non-duplicative incoming data units are added to the persistent fingerprint index. In other cases, either full sampling (100% sampling) or no sampling (0% sampling) can be performed.

Figure 18:
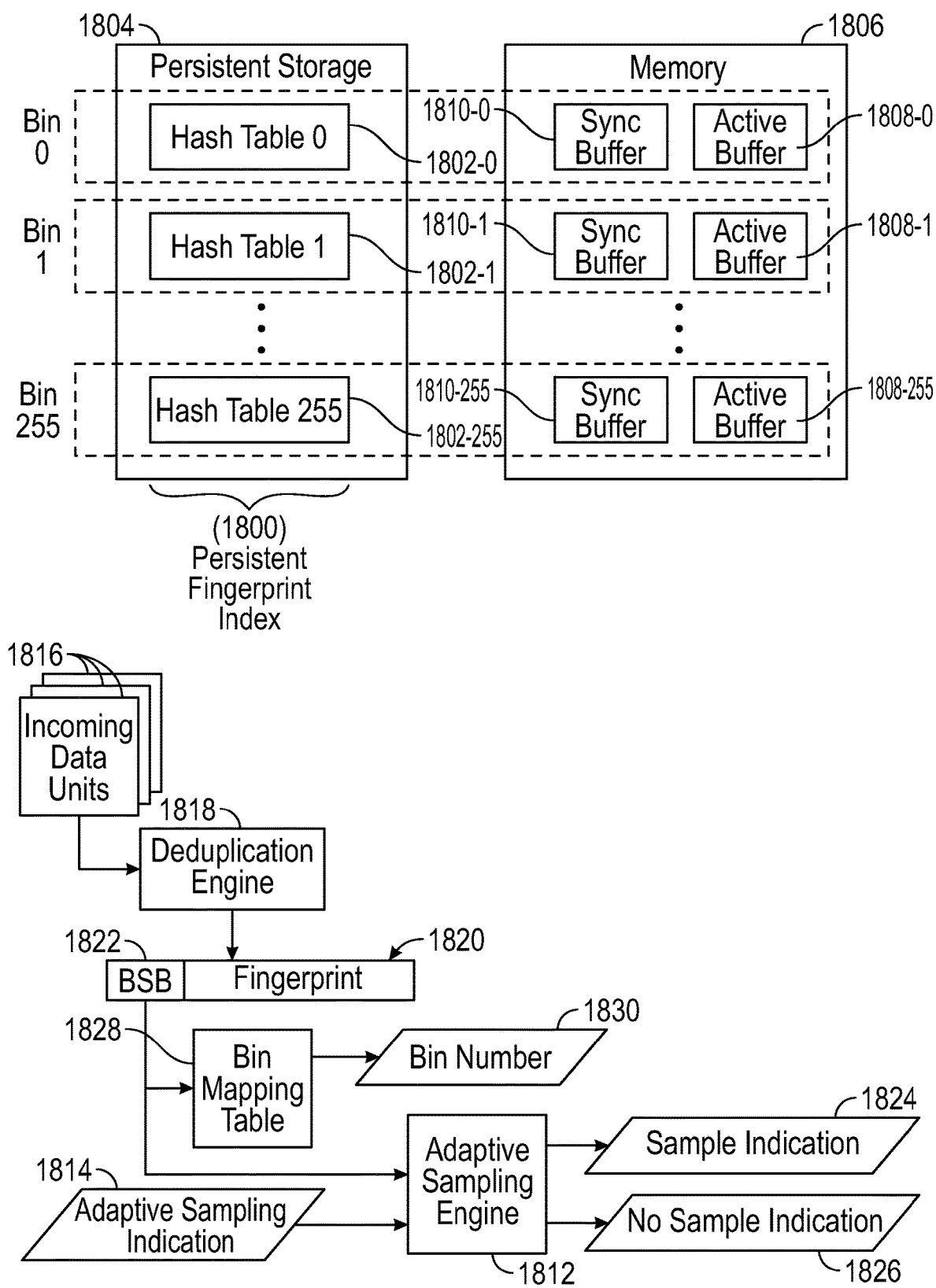
FIG. 18 is a block diagram of a storage system in which the persistent storage index and in-memory buffers are divided into multiple bins for use with an adaptive sampling engine, according to some examples.

As shown in FIG. 18, in accordance with some implementations of the present disclosure, a persistent fingerprint index 1800 is divided into multiple hash tables 1802-0 to 1802-255 (e.g., log structured hash tables as discussed above). The hash tables 1802-0 to 1802-255 are part of respective bins 0 to 255. In the example of FIG. 18, it is assumed that there 256 bins. In other examples, a binning technique can use a different number of bins.

The 256 hash tables 1802-0 to 1802-255 of the persistent fingerprint index 1800 are stored in persistent storage 1804. Each of the hash tables is arranged into segments that have leaf blocks and indirect blocks similar to the arrangement shown in FIG. 2.

Effectively, in the example of FIG. 18, the persistent fingerprint index 1800 is divided into 256 fingerprint index sections, where each fingerprint index section includes a respective hash table 1802-0 to 1802-255 in some examples.

Each bin further includes respective data structures stored in a memory 1806. In the example of FIG. 18, each bin j (j=0 to 255) includes a respective active buffer 1808-j and a respective sync buffer 1810-j in the memory 1806. The active buffer 1808-j and sync buffer 1810-j for each bin j operates in similar fashion as the active buffer 106 and the sync buffer 108, respectively, of FIG. 1.

FIG. 18 shows an adaptive sampling engine 1812 that is used to perform adaptive sampling based on an adaptive sampling indication 1814 received by the adaptive sampling engine 1812. The adaptive sampling indication 1814 can include a value that provides an indication of the sampling to be applied, where the sampling can range from no sampling (i.e., no fingerprint for incoming data units 1816 are stored in the persistent fingerprint index 1800) to full sampling (fingerprints for all non-duplicative incoming data units 1816 are added to the persistent fingerprint index 1800, or more specifically, to respective hash tables of the persistent fingerprint index 1800). For example, the adaptive sampling indication 1814 can have a value that ranges between 0 (indicating no sampling) and 255 (indicating full sampling) or any value between 0 and 255 (indicating partial sampling).

The adaptive sampling indication 1814 can be configured by a user, set by a program, set by a remote service, set by a machine, and so forth. The adaptive sampling indication 1814 can be stored in the persistent storage 1804 and/or in the memory 1806.

The value of the adaptive sampling indication 1814 can be dynamically adjusted in response to any of various triggering conditions. The triggering conditions can include any or some combination of the following: an amount of the memory 1806 consumed by the buffers 1808-0 to 1808-255 and 1810-0 to 1810-255 containing fingerprint index entries exceeding a memory usage threshold, an amount of a buffer (e.g., any of 1808-0 to 1808-255 and 1810-0 to 1810-255) in the memory 1806 being filled with fingerprint index entries exceeding a buffer threshold, a fill rate of a buffer (e.g., any of 1808-0 to 1808-255 and 1810-0 to 1810-255) in the memory 1806 exceeding a fill rate threshold, a rate of lookup of the persistent fingerprint index 1800 exceeding a lookup rate threshold, or a size of the persistent fingerprint index 1800 exceeding a size threshold, and so forth.

In response to any triggering condition, the value of the adaptive sampling indication 1814 can be reduced to reduce the sampling of fingerprints (i.e., the number of fingerprints added to the persistent fingerprint index 1800 is reduced), or alternatively, the value of the adaptive sampling indication 1814 can be increased to increase the sampling of fingerprints (i.e., the number of fingerprints added to the persistent fingerprint index 1800 is increased).

Adjusting the adaptive sampling indication 1814 allows the overall storage system load to be adjusted based on detected conditions.

In response to the incoming data units 1816, a deduplication engine 1818 produces corresponding fingerprints (which are the partial fingerprints discussed above according to some examples). The deduplication engine 1818 can be similar to the deduplication engine 118 of FIG. 1.

A fingerprint 1820 generated by the deduplication engine 1818 is shown in FIG. 18. The fingerprint 1820 has a certain length. A portion of the fingerprint 1820 is a bin selector byte 1822 that is used to select from among the 256 bins. Although the example refers to a bin selector byte, it is noted that more generally, the fingerprint 1820 can include a bin selector portion made up of a specified number of bits (one bit or multiple bits) of the fingerprint 1820. In some examples, the bin selector byte 1822 can be the most significant byte of the fingerprint 1820. In other examples, the bin selector byte 1822 (or more generally, the bin selector portion) of the fingerprint 1820 can include any other portion of the fingerprint 1820.

The adaptive sampling engine 1812 compares a value of the bin selector byte 1822 of the fingerprint 1820 produced by the deduplication engine 1818 for an incoming data unit 1816 with a value of the adaptive sampling indication 1814. In some examples, if the value of the bin selector byte 1822 is less than or equal the value of the adaptive sampling indication 1814, then the adaptive sampling engine 1812 provides a Sample indication 1824 to indicate that the fingerprint 1820 for the incoming data unit 1816 is to be added to the persistent fingerprint index 1800, assuming that the deduplication engine 1818 has made a determination that the fingerprint 1820 is for a non-duplicative incoming data unit (based on the deduplication process discussed further above).

However, in some examples, if the value of the bin selector byte 1822 exceeds the value of the adaptive sampling indication 1814, then the adaptive sampling engine 1812 provides a No Sample indication 1826 to indicate that the fingerprint 1820 for the incoming data unit 1816 is not to be added to the persistent fingerprint index 1800.

The Sample indication 1824 and the No Sample indication 1826 can be different values of a signal or other indicator.

Although the foregoing examples refer to making a determination of whether the value of the bin selector byte 1822 of the fingerprint 1820 is less than or equal to the value of the adaptive sampling indication 1814, it is noted that in other examples, a different comparison can be made between the value of the bin selector byte 1822 and the value of the adaptive sampling indication 1814. For example, in a different example, the adaptive sampling engine 1812 can make a decision to sample the fingerprint 1820 in response to the bin selector byte 1822 having a value that is greater than or equal the value of the adaptive sampling indication 1814 (and to not sample the fingerprint 1820 if the value of the bin selector byte 1822 is less than the value of the adaptive sampling indication 1814).

In yet further examples, the comparison performed by the adaptive sampling engine 1812 can be for determining other relationships between the value of the bin selector byte 1822 and the value of the adaptive sampling indication 1814. More generally, the adaptive sampling engine 1812 makes a determination of whether a specified relationship exists between the value of the bin selector byte 1822 and the value of the adaptive sampling indication 1814. If the specified relationship exists, then the adaptive sampling engine 1812 provides the Sample indication 1824 to indicate that the fingerprint 1820 is to be sampled. However, if the specified relationship does not exist, the adaptive sampling engine 1812 provides the No Sample indication 1826 to indicate that the fingerprint 1820 is not to be sampled.

Assuming that the adaptive sampling engine 1812 provides the Sample indication 1824, and assuming that the deduplication engine 1818 has determined that the fingerprint 1820 corresponds to a non-duplicative incoming data unit 1816, the adaptive sampling engine 1812 uses the value of the bin selector byte 1822 as an index into a bin mapping table 1828 that maps different values of bin selector bytes to corresponding different bin numbers (bin 0 to bin 255 in the example of FIG. 18).

Based on the value of the bin selector byte 1822, the bin mapping table 1828 outputs a Bin Number 1830 that identifies one of bins 0 to 255. If the Sample indication 1824 is activated by the adaptive sampling engine 1812, then a fingerprint index entry containing the fingerprint 1820 (and the corresponding SBN or other storage location indicator) is added to an active buffer 1808-*j* of the bin j identified by the Bin Number 1830. The adding of the fingerprint index entry to the active buffer 1808-*j* can be performed by the deduplication engine 1818, for example, based on the Sample indication 1824 and the Bin Number 1830.

In other examples, instead of using a bin mapping table 1828, the adaptive sampling engine 1812 can use different correlation information that correlates different values of the bin selector byte 1822 to respective bin numbers.

Figure 19:
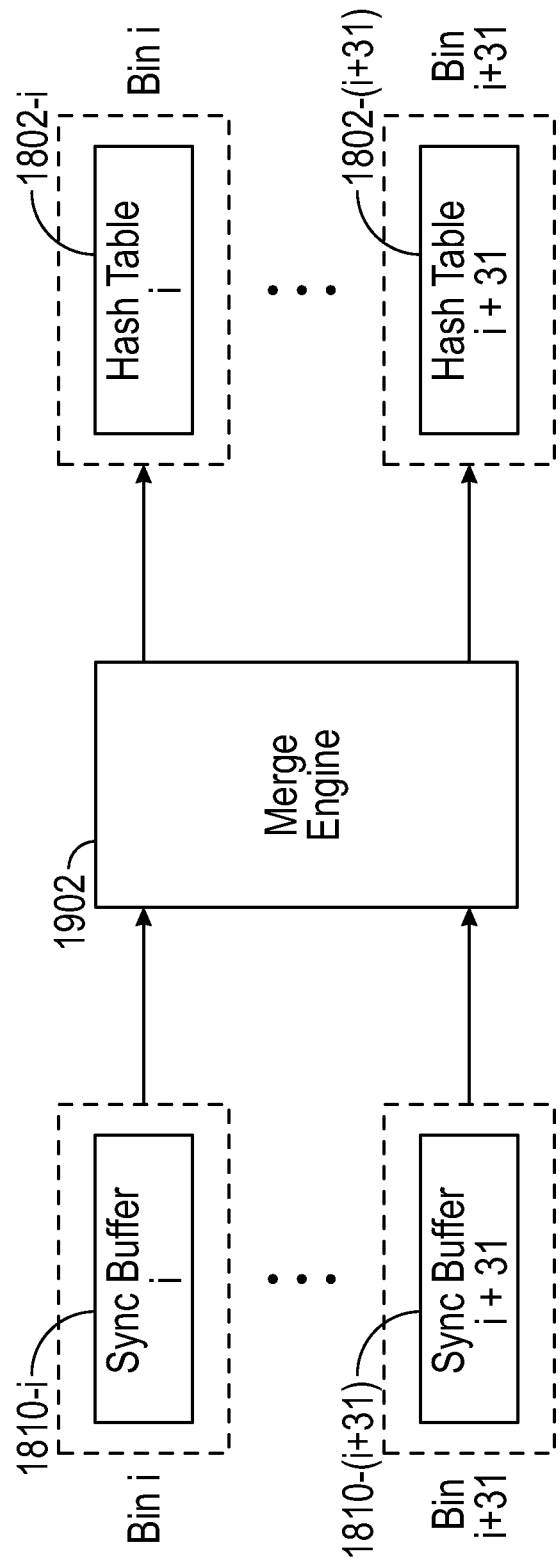
FIG. 19 is a block diagram of an example of a parallel merge process of multiple bins, according to some examples.

FIG. 19 shows an example of merging sync buffers 1810-*i* to 1810-(*i*+31) in respective bins i to i+31 into corresponding hash tables 1802-*i* to 1810-(*i*+31) of the persistent fingerprint index 1800. In the example shown, a merge engine 1902 can merge 32 bins in parallel (i.e., concurrently). The merging of an sync buffer 1810-*j* into a hash table 1802-*j* performed by the merge engine 1902 is similar to the merging performed by the merge engine 109 of FIG. 1.

More generally, the merge engine 1902 receives fingerprint index entries from K sync buffers 1810-*i* to 1810-(*i*+K) of corresponding bins i to i+K, to merge in parallel into respective hash tables 1802-*i* to 1802-(*i*+K). The number K can be a value less than 255 (assuming that 256 bins are used). In other examples, the number K can equal 255, which means that all sync buffers in the bins are merged in parallel into respective hash tables of the persistent fingerprint index 1800.

Merging multiple sync buffers in parallel with respective multiple hash tables of the persistent fingerprint index can refer to fingerprint index entries being read concurrently from the multiple update buffers and written concurrently to the multiple hash tables.

Once an sync buffer 1810-*j* has finished merging with a corresponding hash table 1802-*j*, the sync buffer 1810-*j* is freed and can accept more fingerprint index entries for incoming data units, and the corresponding hash table 1802-*j* is available for lookup by the deduplication engine 1818 (FIG. 18) as part of a deduplication process for incoming data units.

By dividing the merging process into multiple bins, if a crash, fault, or error were to occur in a storage system, any bin that has completed merging would not lose the result of the merge. In other words, updates in bins (or more specifically, in the hash tables of the bins) that have completed merging are not lost due to a crash, fault, or error in the storage system.

For upgrading a B-tree fingerprint index to a fingerprint index in a log structured hash table, the source B-tree fingerprint index can initially be treated as being part of bin 0 (or any other designated bin). Then the merge of the B-tree fingerprint index can proceed to the hash tables of the upgraded fingerprint index.

Although adaptive sampling can cause a subset of fingerprints for non-duplicative incoming data units 1816 to not be added to the persistent fingerprint index 1800, a flocking characteristic of storage of data units in the storage system can be leveraged to allow for enhanced deduplication even though some fingerprints are not placed in the persistent fingerprint index 1800 due to adaptive sampling. Flocking is based on temporal locality of data. A group of data units (such as those of a file or other data object) when first written to the persistent storage 1804, when subjected to a deduplication process, may yield negative results indicating that no duplicates are present in the storage system. As a result, the first write of the group of data units will cause new fingerprint index delta updates to be created that are eventually merged into the persistent fingerprint index 1800 in the persistent storage 1804. This group of data units is grouped temporally in time, e.g., the data units of the group are received in a temporal order, and stored in the temporal order in the persistent storage 1804. It is likely that the same group of data units (e.g., the same file) may be written again at a later time, such that the information added to the persistent fingerprint index 1800 and a location index (e.g., 116 in FIG. 1) due to the first write of the group of data units can be leveraged to perform deduplication of the subsequent writing of the group of data units.

The location index 116 (FIG. 1), which correlates SBNs from the persistent fingerprint index 1800 to full fingerprints as well as to physical locations of respective data units, stores entries for incoming data units in the temporal order according to which the incoming data units were received and/or stored by the storage system. In other words, entries are added to the location index 116 in the temporal order of data units being received and/or stored in the storage system. Entries for incoming data units that are temporally close to each other are also stored close together in the location index 116. In some examples, SBNs are monotonically increasing (e.g., the SBN is incremented for each successive data unit for which an entry is added to the location index 116), such that SBNs for a group of non-duplicative incoming data units received sequentially (in time) will have monotonically increasing SBNs. In this way, data units associated with SBNs that are close to each other are likely to belong to a group of related data units (such as those of a file or other object) that may be accessed near in time to one another when accessed.

When adaptive sampling is performed such that some fingerprints (e.g., partial fingerprints) may not be added to the persistent fingerprint index 1800, the temporal locality of the fingerprints (e.g., full fingerprints) stored in the location index 116 due to flocking can be used to perform deduplication for incoming data units for which the fingerprints were not added to the persistent fingerprint index 1800.

For example, in response to a fingerprint of a given incoming data unit matching an entry present in the persistent fingerprint index 1800, the deduplication engine 1818 uses the SBN of the matching fingerprint index entry to identify a corresponding given location index entry in the location index 116. In response, the deduplication engine 1818 can retrieve a collection of location index entries from the location index 116. The retrieved collection of location index entries can include location index entries that are within a specified proximity in the location index 116, such as location index entries with SBNs within a specified value of the SBN for the given location index entry for the incoming data unit, etc. The collection of location index entries can include full fingerprints of corresponding data units that have temporal locality, and may include location index entries (with full fingerprints) for data units that are not represented in the persistent fingerprint index 1800 (e.g., due to adaptive sampling). The deduplication engine 1818 can deduplicate incoming data blocks using the retrieved collection of location index entries from the location index 116, which may allow the deduplication engine 1818 to perform deduplication even for incoming data units for which partial fingerprints were not added to the deduplication engine 1818 due to adaptive sampling, as the retrieved collection of location index entries may include location index entries with full fingerprints that match fingerprints of data units not represented in the persistent fingerprint index 1800. The deduplication leverages the flocking or other temporal locality characteristic of the collection of location index entries and the incoming data units.

Figure 20:
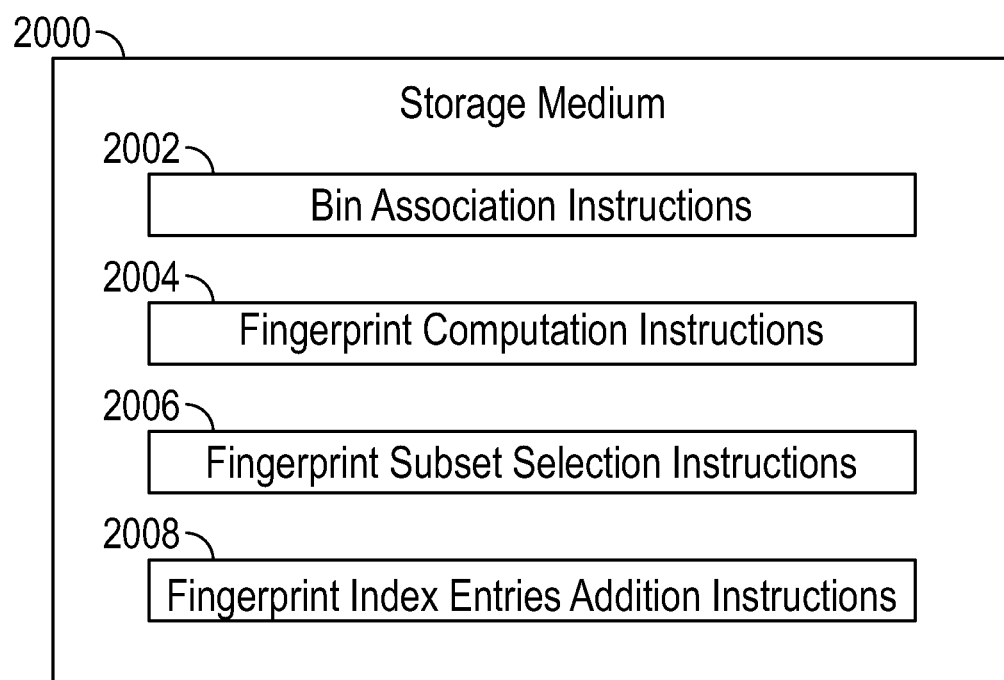
FIG. 20 is a block diagram of a storage medium according to further examples.

FIG. 20 is a block diagram of a storage medium 2000 storing machine-readable instructions that upon execution cause a system to perform various tasks. The machine-readable instructions include bin association instructions 2002 to associate a plurality of buffers (e.g., sync buffers 1810-*j* in FIG. 18) in a memory with respective multiple bins of a fingerprint index in persistent storage.

The machine-readable instructions further include fingerprint computation instructions 2004 to compute fingerprints for incoming data units.

The machine-readable instructions further include fingerprint subset selection instructions 2006 to select, based on an adaptive sampling indication (e.g., 1814 in FIG. 18), a subset (some or all) of the fingerprints, where the adaptive sampling indication indicates a proportion of the fingerprints to be added to the fingerprint index.

The machine-readable instructions further include fingerprint index entries addition instructions 2008 to add fingerprint index entries corresponding to the selected subset of the fingerprints to a respective subset of the multiple bins, where adding a fingerprint index entry to a bin of the respective subset of the multiple bins includes adding the fingerprint index entry to the buffer of the bin.

In some examples, for a given fingerprint, a respective bin is identified based on a sampling portion (e.g., 1822 in FIG. 18) of the given fingerprint. A fingerprint index entry corresponding to the given fingerprint is added to the buffer of the respective bin.

In some examples, different values of the sampling portions of the fingerprints map to respective different bins of the multiple bins.

In some examples, fingerprint index entries in a first buffer of the plurality of buffers are merged to a first section (e.g., a hash table) of the fingerprint index, where the first section of the fingerprint index is part of a first bin of the multiple bins.

In some examples, a lookup of the first section of the fingerprint index after completion of the merge of the fingerprint index entries in the first buffer to the first section can be performed, while a merge is proceeding of fingerprint index entries in a second buffer of the plurality of buffers to a second section of the fingerprint index bin, the second section of the fingerprint index being part of a second bin of the multiple bins.

Figure 21:
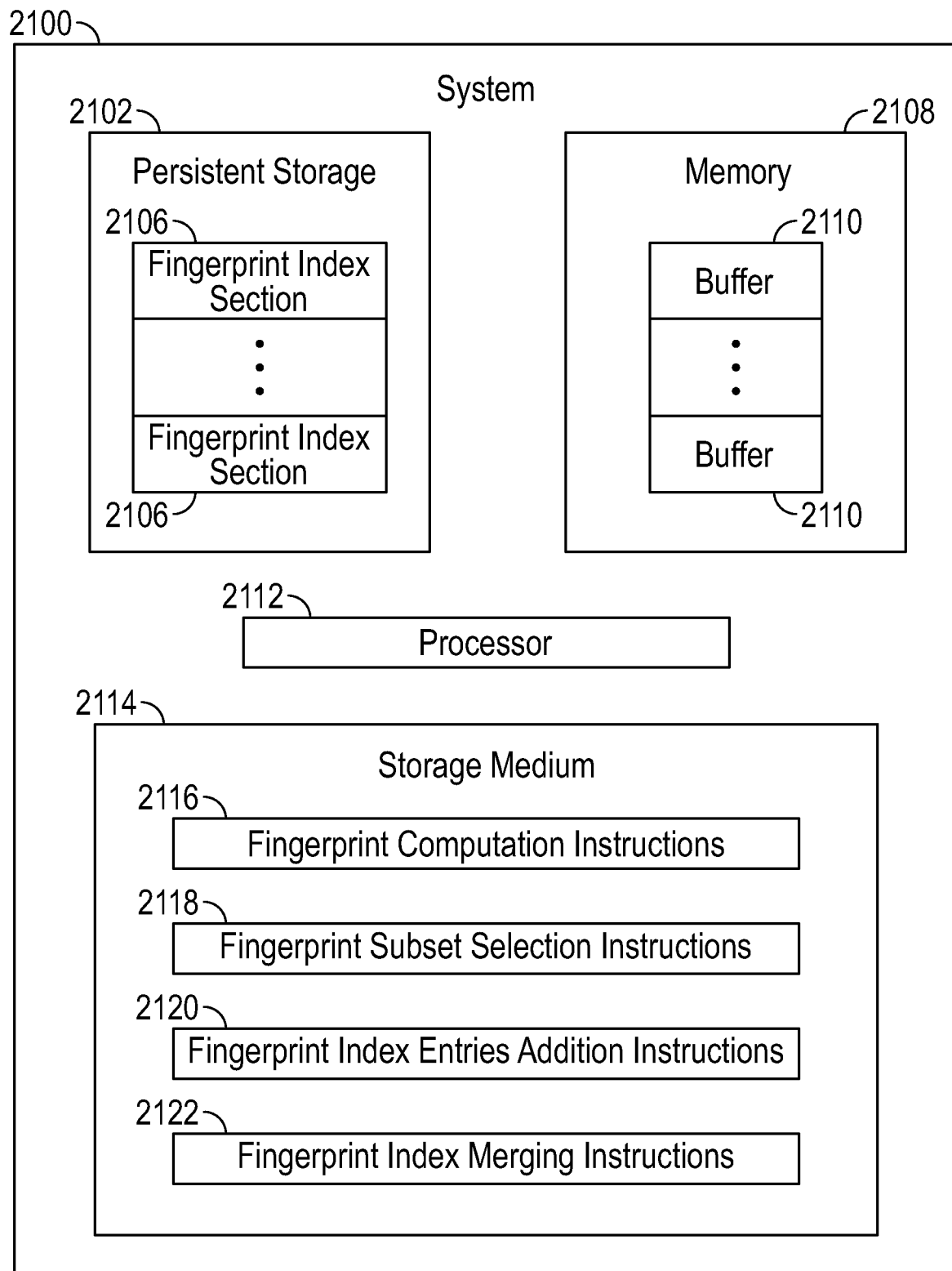
FIG. 21 is a block diagram of a system according to further examples.

FIG. 21 is a block diagram of a system 2100 that includes persistent storage 2102 to store a fingerprint index 2104 divided into a plurality of fingerprint index sections 2106 (e.g., hash tables), the plurality of fingerprint index sections 2106 being part of respective bins of a plurality of bins.

The system 2100 includes a memory 2108 to store buffers 2110 that are part of the respective bins of a plurality of bins.

The system 2100 includes a hardware processor 2112 (or multiple hardware processors, and a storage medium 2114 storing machine-readable instructions executable on the hardware processor 2112 to perform various tasks. The storage medium 2114 can be separate from the persistent storage 2102 and/or the memory 2108, or alternatively, can include portions of the persistent storage 2102 and/or the memory 2108.

The machine-readable instructions of the storage medium 2114 include fingerprint computation instructions 2116 to compute fingerprints for incoming data units.

The machine-readable instructions of the storage medium 2114 include fingerprint subset selection instructions 2118 to select, based on an adaptive sampling indication, a subset of the fingerprints, the adaptive sampling indication indicating a proportion of the fingerprints to be added to the fingerprint index.

The machine-readable instructions of the storage medium 2114 include fingerprint index entries addition instructions 2120 to add fingerprint index entries corresponding to the selected subset of the fingerprints to a respective subset of the multiple bins, where adding a fingerprint index entry to a bin of the respective subset of the multiple bins comprises adding the fingerprint index entry to the buffer of the bin.

The machine-readable instructions of the storage medium 2114 include fingerprint index entries merging instructions 2122 to merge fingerprint index entries in a number of the plurality of buffers into respective fingerprint index sections of the fingerprint index.

Figure 22:
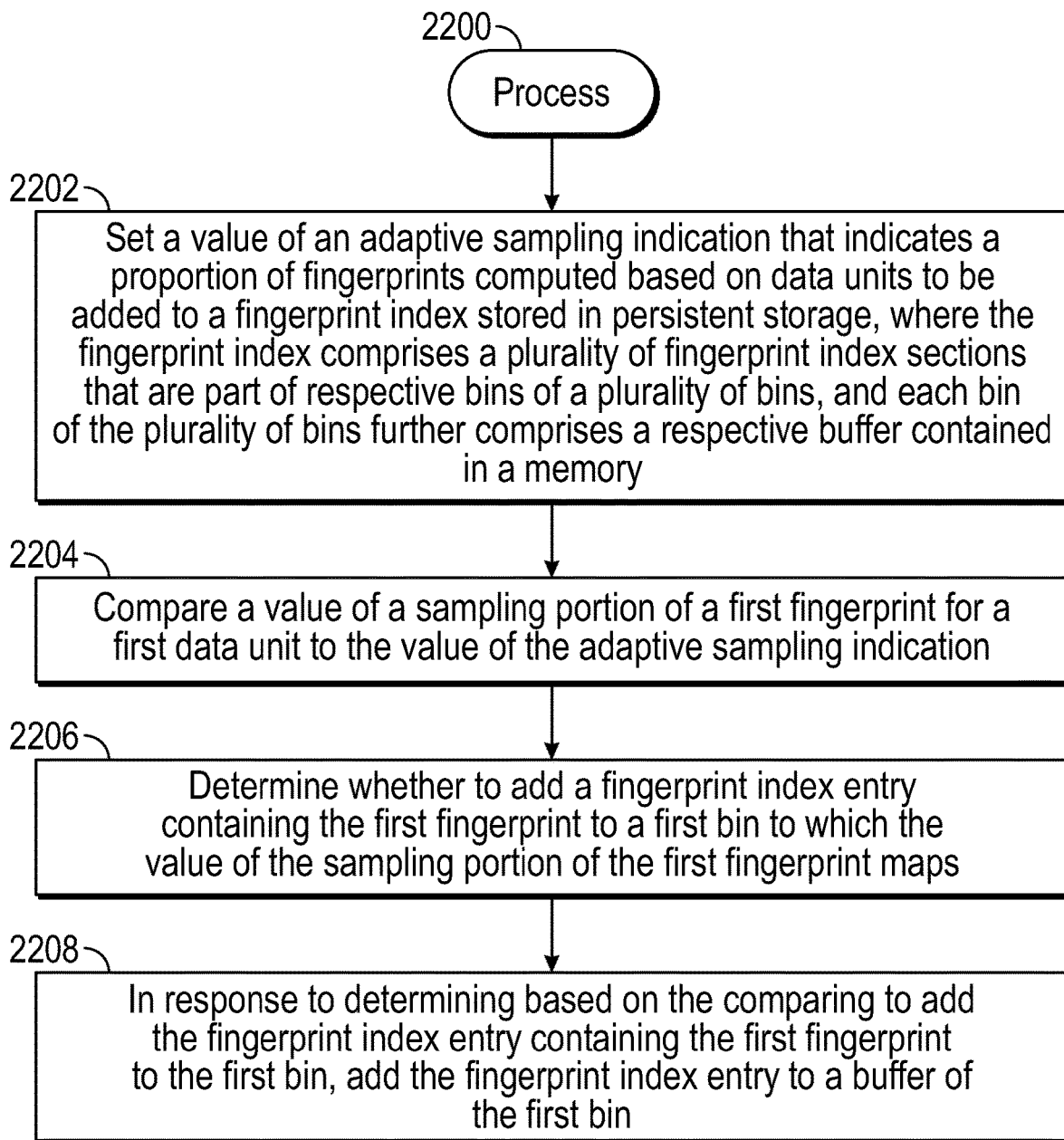
FIG. 22 is a flow diagram of a process according to further examples.

FIG. 22 is a flow diagram of a process 2200 according to further examples. The process 2200 includes setting (at 2202) a value of an adaptive sampling indication that indicates a proportion of fingerprints computed based on data units to be added to a fingerprint index stored in persistent storage, where the fingerprint index comprises a plurality of fingerprint index sections that are part of respective bins of a plurality of bins, and each bin of the plurality of bins further comprises a respective buffer contained in a memory.

The process 2200 includes comparing (at 2204) a value of a sampling portion of a first fingerprint for a first data unit to the value of the adaptive sampling indication.

The process 2200 includes determining (at 2206) whether to add a fingerprint index entry containing the first fingerprint to a first bin to which the value of the sampling portion of the first fingerprint maps.

The process 2200 includes, in response to determining based on the comparing to add the fingerprint index entry containing the first fingerprint to the first bin, adding (at 2208) the fingerprint index entry to a buffer of the first bin.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
perform data deduplication using a fingerprint index comprising a plurality of blocks, each block of the plurality of blocks comprising multiple buckets of a plurality of buckets, and each bucket of the plurality of buckets comprising entries associating fingerprints for data units to storage location indicators of the data units, wherein a storage location indicator of the storage location indicators provides an indication of a storage location of a data unit in a persistent storage;
merge fingerprint index entries from a buffer in a memory to the fingerprint index; and
for adding a new fingerprint to the fingerprint index as part of the merging of the fingerprint index entries from the buffer to the fingerprint index:
detect that a corresponding bucket in a first block of the plurality of blocks is full,
in response to the detecting, add space to the corresponding bucket to produce an increased size corresponding bucket by taking a respective amount of space from a further bucket in the first block, wherein the increased size corresponding bucket has a larger storage capacity than the corresponding bucket prior to adding space to the corresponding bucket, and wherein taking the respective amount of space from the further bucket reduces a size of the further bucket by the respective amount of space, and
insert the new fingerprint into the increased size corresponding bucket.

2. The non-transitory machine-readable storage medium of claim 1, wherein the space added to the corresponding bucket is taken from the further bucket that is adjacent to the corresponding bucket in the first block.

3. The non-transitory machine-readable storage medium of claim 1, wherein the instructions upon execution cause the system to:
for adding a second new fingerprint to the fingerprint index as part of the merging of the fingerprint index entries from the buffer to the fingerprint index:
detect that a second corresponding bucket in a second block of the plurality of blocks is full, and that the second block is full, and
in response to detecting that the second corresponding bucket is full and the second block is full, increase a size of the second block to add the second new fingerprint to the second corresponding bucket.

4. The non-transitory machine-readable storage medium of claim 3, wherein the instructions upon execution cause the system to increase the size of the second block up to a maximum block size.

5. The non-transitory machine-readable storage medium of claim 3, wherein the instructions upon execution cause the system to determine that the second block is full based on all buckets of the second block being full.

6. The non-transitory machine-readable storage medium of claim 3, wherein the instructions upon execution cause the system to set an indicator to indicate that the size of the second block has been increased.

7. The non-transitory machine-readable storage medium of claim 6, wherein the plurality of blocks each has a target block size, and wherein the indicator indicates that the size of the second block has been increased to a size greater than the target block size.

8. The non-transitory machine-readable storage medium of claim 7, wherein the indicator comprises a flag set to a first value, and wherein the flag when set to a second value different from the first value indicates that the second block has the target block size.

9. The non-transitory machine-readable storage medium of claim 6, wherein the instructions upon execution cause the system to store the indicator as part of a collection of indicators for indicating respective blocks of the plurality of blocks that have increased in size.

10. The non-transitory machine-readable storage medium of claim 9, wherein the collection of indicators are part of a bitmap comprising bits settable to a first value to provide the indicators.

11. The non-transitory machine-readable storage medium of claim 1, wherein the instructions upon execution cause the system to use an indirect block in the memory to access a given block of the plurality of blocks in the fingerprint index, the indirect block containing references to blocks of the fingerprint index.

12. The non-transitory machine-readable storage medium of claim 1, wherein the instructions upon execution cause the system to:

receive an incoming data unit; and
compute the new fingerprint based on the incoming data unit.

13. A system comprising:
a processor; and
a non-transitory storage medium storing instructions executable on the processor to:
perform data deduplication using a fingerprint index comprising a plurality of blocks, each block of the plurality of blocks comprising multiple buckets of a plurality of buckets, and each bucket of the plurality of buckets comprising entries associating fingerprints for data units to storage location indicators of the data units, wherein a storage location indicator of the storage location indicators provides an indication of a storage location of a data unit in a persistent storage;
merge fingerprint index entries from a buffer in a memory to the fingerprint index; and
for adding a new fingerprint to the fingerprint index as part of the merging of the fingerprint index entries from the buffer to the fingerprint index:
determine whether a corresponding bucket in a first block of the plurality of blocks is full,
in response to determining that the corresponding bucket in the first block is full, add space to the corresponding bucket to produce an increased size corresponding bucket by taking a respective amount of space from a further bucket in the first block, wherein the increased size corresponding bucket has a larger storage capacity than the corresponding bucket prior to adding space to the corresponding bucket, and wherein taking the respective amount of space from the further bucket reduces a size of the further bucket by the respective amount of space, and
insert the new fingerprint into the increased size corresponding bucket.

14. The system of claim 13, wherein the space added to the corresponding bucket is taken from the further bucket that is adjacent to the corresponding bucket in the first block.

15. The system of claim 14, wherein the instructions are executable on the processor to:
compute a block index based on the new fingerprint, wherein the block index identifies the first block.

16. The system of claim 14, wherein the instructions are executable on the processor to:
compute a further fingerprint based on a further incoming data unit;
add the further fingerprint to the fingerprint index based on:
determining whether a further respective block of the plurality of blocks is full;
in response to determining that the further respective block is full, increasing a size of the further respective block; and
adding the further fingerprint to a bucket of the further respective block.

17. The system of claim 16, wherein the increasing of the size of the further respective block comprises increasing the size of the further respective block up to a maximum block size.

18. The system of claim 16, wherein the instructions are executable on the processor to:
update a flag in an array of flags in response to the increasing of the size of the further respective block, the updated flag indicating that the further respective block has increased in size from a target block size.

19. A method performed by a system comprising a hardware processor, comprising:
storing, in a fingerprint index in a persistent storage, fingerprint index entries in buckets of a plurality of blocks, each fingerprint index entry of the fingerprint index entries associating a fingerprint with a storage location indicator of a data unit, wherein the storage location indicator provides an indication of a storage location of the data unit in the persistent storage, and wherein each block of the plurality of blocks includes multiple buckets, and each bucket of the multiple buckets stores multiple fingerprint index entries;
computing fingerprints for incoming data units; and
to add a computed fingerprint of the computed fingerprints to the fingerprint index:
identifying, for the computed fingerprint, a first block of the plurality of blocks into which the computed fingerprint is to be added, wherein the identified first block is based on a block index produced from the computed fingerprint,
detecting that the first block is full based on detecting all buckets of the first block are in a bucket full condition,
in response to the detecting that the first block is full, adding space to the first block to produce an increased size first block, wherein the increased size first block has a larger storage capacity than the first block prior to adding space to the first block, and
adding the computed fingerprint to a given bucket of the increased size first block.

20. The method of claim 19, further comprising:
after adding the space to the first block:
adding bucket space to the given bucket that is full to produce an increased size given bucket by taking a corresponding amount of space from a further bucket of the first block, wherein the increased size given bucket has a larger storage capacity than the given bucket prior to adding bucket space to the given bucket, and
adding the computed fingerprint to the increased size given bucket.

* * * * *